(12) United States Patent
Kaltenbach et al.

(10) Patent No.: US 8,960,033 B2
(45) Date of Patent: Feb. 24, 2015

(54) HYBRID DRIVE OF A MOTOR VEHICLE

(75) Inventors: Johannes Kaltenbach, Friedrichshafen (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 17 days.

(21) Appl. No.: 14/003,458

(22) PCT Filed: Feb. 1, 2012

(86) PCT No.: PCT/EP2012/051632
§ 371 (c)(1),
(2), (4) Date: Sep. 6, 2013

(87) PCT Pub. No.: WO2012/123171
PCT Pub. Date: Sep. 20, 2012

(65) Prior Publication Data
US 2013/0345018 A1    Dec. 26, 2013

(30) Foreign Application Priority Data

Mar. 15, 2011    (DE) .................... 10 2011 005 532

(51) Int. Cl.
*F16H 3/08*    (2006.01)
*F16H 37/06*    (2006.01)
(Continued)

(52) U.S. Cl.
CPC ............... *F16H 37/065* (2013.01); *B60K 6/48* (2013.01); *B60K 6/547* (2013.01); *B60K 2006/4825* (2013.01); *B60K 2006/4841* (2013.01);
(Continued)

(58) Field of Classification Search
USPC .................... 74/330, 331, 333, 661
See application file for complete search history.

(56) References Cited

U.S. PATENT DOCUMENTS 6,244,123 B1 * 6/2001 Hegerath et al. ................ 74/325
6,634,247 B2 * 10/2003 Pels et al. ....................... 74/329
(Continued)

FOREIGN PATENT DOCUMENTS

DE    35 46 454 A1    2/1987
DE    199 60 621 A1    6/2001
(Continued)

OTHER PUBLICATIONS

Tenberge P: "Double-Clutch Transmission—Power-Shiftable Winding Transmission", VDI Berischte, Duesseldorf, Germany, vol. 1665, Mar. 13, 2002.

(Continued)

*Primary Examiner* — Ha D Ho
(74) *Attorney, Agent, or Firm* — Davis & Bujold, PLLC; Michael J. Bujold

(57) ABSTRACT

A hybrid drive of a motor vehicle having an automated manual transmission with two coaxial input shafts and a common output shaft. The input shafts are respectively driven by an engine and an electric machine and can couple the output shaft via respective groups of gearwheel sets. Each gearwheel set comprises a gear fixed to the associated input shaft and an idler gear supported by respective countershafts. At least two idler gears disposed on one of the two countershafts of two gearwheel sets, within the transmission, assigned to two different input shafts, can be coupled via a winding-path shift element, and the two output constants are disposed in a common radial plane by using a common output gear disposed on the output shaft.

16 Claims, 30 Drawing Sheets

(51) Int. Cl.
*B60K 6/48* (2007.10)
*B60K 6/547* (2007.10)
*F16H 3/00* (2006.01)
*F16H 3/093* (2006.01)

(52) U.S. Cl.
CPC .............. *F16H3/006* (2013.01); *F16H 3/093* (2013.01); *F16H 2003/0826* (2013.01); *F16H 2003/0935* (2013.01); *Y02T 10/6221* (2013.01); *Y02T 10/6252* (2013.01); *Y10S 903/902* (2013.01)
USPC .............................. 74/331; 74/661; 903/902

(56) References Cited

U.S. PATENT DOCUMENTS

| | | | |
|---|---|---|---|
| 7,225,696 B2 * | 6/2007 | Gitt | 74/340 |
| 7,287,442 B2 | 10/2007 | Gumpoltsberger | |
| 7,604,565 B2 * | 10/2009 | Lee et al. | 477/3 |
| 8,257,221 B2 | 9/2012 | Leufgen | |
| 8,342,049 B2 | 1/2013 | Rieger | |
| 8,393,238 B2 | 3/2013 | Gumpoltsberger et al. | |
| 2005/0139035 A1 | 6/2005 | Lee et al. | |
| 2006/0130601 A1 | 6/2006 | Hughes | |
| 2009/0036247 A1 * | 2/2009 | Earhart et al. | 475/35 |
| 2010/0120580 A1 | 5/2010 | Mepham et al. | |
| 2010/0197436 A1 | 8/2010 | Ideshio et al. | |
| 2010/0311540 A1 | 12/2010 | Hellenbroich | |

FOREIGN PATENT DOCUMENTS

| | | |
|---|---|---|
| DE | 101 33 695 A1 | 3/2002 |
| DE | 103 05 241 A1 | 9/2004 |
| DE | 10 2005 048 938 A1 | 4/2007 |
| DE | 10 2005 049 992 A1 | 4/2007 |
| DE | 10 2006 036 758 A1 | 2/2008 |
| DE | 10 2007 042 949 A1 | 4/2009 |
| DE | 10 2007 049 266 A1 | 4/2009 |
| DE | 10 2007 049 271 A1 | 4/2009 |
| DE | 10 2009 000 725 A1 | 8/2010 |
| DE | 10 2010 030 569 A1 | 12/2011 |
| EP | 1 610 038 A1 | 12/2005 |
| EP | 1 972 481 A1 | 9/2008 |
| FR | 2 811 395 A1 | 1/2002 |
| JP | 2010-203605 A | 9/2010 |
| WO | 2007/042109 A1 | 4/2007 |
| WO | 2008/138387 A1 | 11/2008 |
| WO | 2009/050078 A2 | 4/2009 |
| WO | 2012/000706 A1 | 1/2012 |

OTHER PUBLICATIONS

German Search Report Corresponding to 10 2011 005 451.0 mailed Jan. 23, 2012.
German Search Report Corresponding to 10 2011 005 532.0 mailed Jan. 27, 2012.
International Search Report Corresponding to PCT/EP2012/051626 mailed Mar. 20, 2012.
International Search Report Corresponding to PCT?EP2012/051629 mailed May 14, 2012.
International Search Report Corresponding to PCT/EP2012/051632 mailed Mar. 20, 2012.
Written Opinion Corresponding to PCT/EP2012/051626 mailed Mar. 20, 2012.
Written Opinion Corresponding to PCT/EP2012/051629 mailed May 14, 2012.
Written Opinion Corresponding to PCT/EP2012/051632 mailed Mar. 20, 2012.

* cited by examiner

|    | K1 | A | B | C | D | E | F | SW | SK |
|----|----|----|----|----|----|----|----|----|----|
| G2 | X  |   |   | X |   |   |   |   |   |
| G3 | X  |   |   |   | X |   |   |   | X |
| G4 | X  |   |   |   |   | X |   |   |   |
| G5 | X  | X |   |   |   |   |   |   | X |
| G6 | X  |   | X |   |   |   |   |   |   |
| G7 | X  | X |   |   |   |   |   | X |   |
| R1 | X  |   |   |   |   |   | X |   |   |

Fig.1a

|    | K2 | A | B | C | D | E | F | SW | SK |
|----|----|---|---|---|---|---|---|----|----|
| G1 | X  |   |   | X |   |   |   | X  |    |
| G2 | X  |   |   | X |   |   |   |    | X  |
| G3 | X  |   |   |   | X |   |   |    |    |
| G4 | X  |   |   |   |   | X |   |    | X  |
| G5 | X  | X |   |   |   |   |   |    |    |
| G6 | X  |   | X |   |   |   |   |    | X  |
| R1 | X  |   |   |   |   |   | X |    | X  |
| R2 | X  |   |   |   |   |   | X | X  |    |

Fig.4a

|    | K1 | A | B | C | D | E | F | SW |
|----|----|----|----|----|----|----|----|----|
| G2 | X  |   |   | X |   |   |   |    |
| G4 | X  |   |   |   |   | X |   |    |
| G6 | X  |   | X |   |   |   |   |    |
| G7 | X  | X |   |   |   |   |   | X  |
| R1 | X  |   |   |   |   |   | X |    |

Fig. 7a

|     | K2 | A | B | C | D | E | F | SW |
|-----|----|---|---|---|---|---|---|----|
| G1  | X  |   |   | X |   |   |   | X  |
| G3  | X  |   |   |   | X |   |   |    |
| G4* | X  |   | X |   |   |   |   | X  |
| G5  | X  | X |   |   |   |   |   |    |
| R2  | X  |   |   |   |   |   | X | X  |

Fig.9a

|    | A | B | C | D | E | SW | SK |
|----|---|---|---|---|---|----|----|
| G2 |   |   | X |   |   |    |    |
| G3 |   |   |   | X |   |    | X  |
| G4 |   |   |   |   | X |    |    |
| G5 | X |   |   |   |   |    | X  |
| G6 |   | X |   |   |   |    |    |
| G7 | X |   |   |   |   | X  |    |

Fig.11a

|    | A | B | C | D | E | SW | SK |
|----|---|---|---|---|---|----|----|
| G1 |   |   | X |   |   | X  |    |
| G2 |   |   | X |   |   |    | X  |
| G3 |   |   |   | X |   |    |    |
| G4 |   |   |   |   | X |    | X  |
| G5 | X |   |   |   |   |    |    |
| G6 |   | X |   |   |   |    | X  |

Fig.14a

|    | A | B | C | D | E | SW |
|----|---|---|---|---|---|----|
| G2 |   |   | X |   |   |    |
| G4 |   |   |   |   | X |    |
| G6 |   | X |   |   |   |    |
| G7 | X |   |   |   |   | X  |

Fig.17a

|     | A | B | C | D | E | SW |
|-----|---|---|---|---|---|----|
| G1  |   |   | X |   |   | X  |
| G3  |   |   |   | X |   |    |
| G4* |   | X |   |   |   | X  |
| G5  | X |   |   |   |   |    |

Fig.19a

|    | K1 | K2 | A | B | C | D | E | F | SW |
|----|----|----|---|---|---|---|---|---|----|
| G1 |    | X  |   |   | X |   |   |   | X  |
| G2 | X  |    |   |   | X |   |   |   |    |
| G3 |    | X  |   |   |   | X |   |   |    |
| G4 | X  |    |   |   |   |   | X |   |    |
| G5 |    | X  | X |   |   |   |   |   |    |
| G6 | X  |    |   | X |   |   |   |   |    |
| G7 | X  |    | X |   |   |   |   |   | X  |
| R1 | X  |    |   |   |   |   |   | X |    |
| R2 |    | X  |   |   |   |   |   | X | X  |

Fig.21a

HYBRID DRIVE OF A MOTOR VEHICLE

This application is a National Stage completion of PCT/EP2012/051632 filed Feb. 1, 2012, which claims priority from German patent application serial no. 10 2011 005 532.0 filed Mar. 15, 2011.

FIELD OF THE INVENTION

The invention relates to a hybrid drive of a motor vehicle, which has an automated manual transmission derived from a double clutch transmission with two coaxially disposed input shafts and a common output shaft, in which one of the input shafts of the hybrid drive can be connected to the drive shaft of an internal combustion engine and can be brought into drive connection with the output shaft via an associated first group of selectively shiftable gear wheel sets, and the other input shaft of the hybrid drive is in drive connection with the rotor of an electric machine that can be operated as a motor and as a generator, and can be brought into drive connection with the output shaft via an assigned second group of selectively shiftable gear wheel sets.

BACKGROUND OF THE INVENTION

A manual transmission of a hybrid drive of the initially named type has a force transmission branch of an internal combustion engine and a force transmission branch of an electric motor that are combined at the output shaft. The force transmission branch of the internal combustion engine comprises an input shaft, the gear wheel sets of the first associated group and the output shaft, and allows the transmission of torque between the internal combustion engine and the drive wheels of the motor vehicle in drive connection with the output shaft. The force transmission branch of the electric motor comprises the other input shaft, the gear wheel sets of the second associated group and the output shaft, and allows the transmission of torque between the electric machine and the drive wheels of the motor vehicle. Thus, a driving operation based solely on the internal combustion engine is possible via a shifted gear wheel set of the first associated group, a driving operation based solely on the electric motor is possible via a shifted gear wheel set of the second assigned group, and a combined driving operation of both aggregates (internal combustion engine and electric machine), with a motor or generator operation of the electric machine is possible in each case via a shifted gearwheel set of both groups. Additionally, gear changes within a group of gear wheel sets can be performed as shifts under load, in that during the gear change the tractive force is at least partially maintained by the aggregate (internal combustion engine or electric machine) associated with the other group of gear wheel sets, via a gearwheel set engaged there.

The document DE 199 60 621 B4 describes one such hybrid drive having three embodiments of a specific manual transmission. In all embodiments, the internal combustion engine force transmission branch of the manual transmission has a first countershaft, which, on the input side, can be brought in drive connection with the drive shaft of the internal combustion engine via an input constant, a first input shaft and a friction clutch, and, on the output side, can be brought in drive connection with the output shaft via a first group of selectively shiftable gear wheel sets. In the first embodiment according to FIG. 1 contained in the document, a second input shaft is designed as a second countershaft, which is connected in a rotationally fixed manner to the rotor of an electric machine, and via a second group of selectively shiftable gear wheel sets, can be brought in drive connection with the output shaft. The two input shafts can be coupled together by a clutch disposed between the countershaft-side drive gear of a drive step disposed between the first input shaft and the second countershaft, and the second countershaft. In the second and third embodiments according to the FIGS. 2 and 3 contained in the document, the second input shaft is implemented as a hollow rotor shaft, which is disposed coaxially over the first input shaft and is connected in a rotationally fixed manner to the rotor of an electric machine disposed coaxially over the first input shaft. The rotor shaft is in drive connection, via a second input constant, with the second countershaft, which can be brought in drive connection with the output shaft, via the second group of selectively shiftable gear wheel sets. The two input shafts can be coupled together by a clutch disposed between the first input shaft and the rotor shaft.

With a further such hybrid drive, which is disclosed in the document WO 2008/138387 A1, the two input shafts of the respective manual transmission are designed as countershafts. The first input shaft, or countershaft, of the internal combustion engine force transfer branch can be connected on the input side to the drive shaft of the internal combustion engine, via a controllable separating clutch, and on the output side can be brought in drive connection with the output shaft, via a first group of selectively shiftable gear wheel sets. The second input shaft, or countershaft, of the electric motor force transfer branch can be connected on the input side in a rotationally fixed manner to the rotor of the electric machine, and on the output side can be brought in drive connection with the output shaft via a second group of selectively shiftable gear wheel sets. The gear wheel sets of both groups, by using in each case a common output gear disposed on the output shaft, are disposed in a common radial plane, which results in a relatively compact axial constructive length. The idler gears and the associated gear clutches of two axially adjacent gear wheel sets of the second group, combined in a shift packet, are disposed on the output shaft. As a result, the two counter shafts can be coupled together, via one of the respective gear clutches disposed on the counter shaft, independently of the shifting of one of the respective gear sets.

A disadvantage of the two named hybrid transmissions is however that the respective manual transmissions are special designs that are accordingly expensive to manufacture.

In contrast, several designs of such a hybrid drive are known from the unpublished document DE 10 2010 030 569 A1, with which the respective manual transmission can be derived from a double clutch transmission having two coaxially disposed input shafts and a common output shaft, and as a result can be manufactured economically. Whereas the centrally disposed first input shaft can be connected, via a separating clutch, to the drive shaft of the internal combustion engine, the second input shaft, designed as a hollow shaft, and disposed coaxially over the first input shaft, is in drive connection directly, or via an input transmission step, with the rotor of the electric machine. The shiftable gear wheel sets are each disposed between one of two countershafts in drive connection with one of the input shafts, in each case via an input constant, and the output shaft, wherein in each case gear wheel sets assigned to two different countershafts are disposed in a common radial plane with an arrangement of the idler gears on the respective counter shaft and by using a common fixed gear disposed on the output shaft. A coupling shift element, disposed externally to the transmission, directly between the two input shafts, for coupling the two input shafts, is designed as a friction clutch or as a claw clutch.

However, a disadvantage of the last named hybrid drive is that the axial constructive length of the manual transmission is relatively large due to the axial staggering of the gear wheel sets and the input constants. This inevitably leads to axially large dimensions of the entire hybrid drive which makes the use thereof at least difficult in a motor vehicle, particularly with a front-transverse arrangement.

SUMMARY OF THE INVENTION

Therefore the problem addressed by the present invention is to propose a hybrid drive of the initially named type, the manual transmission of which has a particularly compact axially constructive length despite a large number of shiftable gear steps.

This problem is solved by a hybrid drive with gear wheel sets which are disposed in each case between one of the two input shafts and one of two countershafts that are each in drive connection with the output shaft via an output constant, wherein each gear wheel set comprises a fixed gear disposed on the associated input shaft in a rotationally fixed manner and an idler gear disposed on the respective countershaft, wherein for each input shaft at least the two gear wheel sets, internal to the transmission, with idler gears disposed on different countershafts, are disposed in a common radial plane, using a common fixed gear, wherein at least two idler gears, disposed on one of the two countershafts, of two gear wheel sets, internal to the transmission, assigned to two different input shafts, can be coupled together by via a winding-path shift element, and wherein the two output constants are disposed in a common radial plane with the use of a common output gear disposed on the output shaft.

The invention is based on a known hybrid drive of a motor vehicle, which has an automated manual transmission derived from a double clutch transmission with two coaxially disposed input shafts and a common output shaft, one of which input shafts of the hybrid drive can be connected to the drive shaft of an internal combustion engine and can be brought into drive connection with the output shaft via an associated first group of selectively shiftable gear wheel sets, and the other input shaft of the hybrid drive is in drive connection with the rotor of an electric machine that can be operated as a motor and as a generator, and can be brought into drive connection with the output shaft via an assigned second group of selectively shiftable gear wheel sets.

In order to create a hybrid drive that is axially particularly short, and has a multi-step manual transmission, it is additionally provided according to the invention that the gear wheel sets of the manual transmission are each disposed between one of the two input shafts and one of the countershafts, in drive connection with the output shaft, in each case via an output constant. Here, each gear wheel set comprises a fixed gear disposed in a rotationally fixed manner on the associated input shaft, and an idler gear disposed on the respective countershaft. With this manual transmission, a plurality of radial planes populated with gear wheel sets are eliminated in that for each input shaft at least the two gear wheel sets, internal to the transmission, and with idler gears disposed on different countershafts, are disposed in a common radial plane, using a common fixed gear. At least one further radial plane populated with one or two gear wheel sets is eliminated with this manual transmission in that at least two idler gears, disposed on one of the two countershafts of two different gear wheel sets internal to the transmission and associated with different input shafts, can by coupled together by via a winding-path shift element. Thereby, at least two gear steps can be shifted as winding-path gears, that is, without specifically associated gear wheel sets. A further radial plane populated with an output constant is eliminated in that the two output constants are disposed in a common radial plane by using a common output gear disposed on the output shaft.

Thus, a significantly shorter axial constructive length of the hybrid drive results according to the invention compared to a hybrid transmission known, for example from the unpublished document DE 10 2010 030 569 A1. This hybrid drive is therefore particularly suited for a front-transverse arrangement in a motor vehicle. The respective manual transmission can be derived with few changes from a double clutch transmission known, for example, from the second embodiment from the document DE 10 2007 049 271 A1, and can therefore be manufactured cost effectively.

In order to make the gear wheel sets of the internal combustion engine force transfer branch, associated with the one input shaft, also available for the electric driving operation, and to make the gear wheel sets of the electric motor force transfer branch, associated with the other input shaft also available for the internal combustion engine driving operation, a clutch shift element is provided for coupling the two input shafts. The respective arrangement of this clutch shift element is aimed toward the design and arrangement of the two input shafts and toward the connection of the internal combustion engine and the electric machine at the respective input shaft, which will be explained in the following in more detail.

The one input shaft can be disposed centrally and extending axially out of one side of an end wall of the housing of the manual transmission, and the other input shaft can be implemented as a hollow shaft and be disposed coaxially over the one input shaft and extending axially out of the same side of the end wall of the housing. Then, it is preferred to dispose the internal combustion engine at the end of the central shaft outside of the transmission, and to dispose the electric machine axially on the same side at the end of the input shaft outside of the transmission implemented as a hollow shaft.

In this case, the clutch shift element can be disposed either within the manual transmission, between the end of the input shaft inside of the transmission implemented as a hollow shaft and the central input shaft, or outside of the manual transmission, between the end of the input shaft, outside of the transmission, implemented as a hollow shaft and the central input shaft.

However, it is also possible that the two input shafts are disposed axially adjacent to each other, and in each case axially extending out of an opposite face side of the housing of the manual transmission. Then, it is preferred to dispose the internal combustion engine on the end of the one input shaft outside of the transmission, and to dispose the electric machine axially opposite on the end of the other input shaft outside of the transmission.

In this case, the clutch shift element is disposed expediently within the manual transmission between the end of the two input shafts, inside of the transmission.

The one input shaft of the transmission of the hybrid drive can be connected, via a friction clutch that can be engaged and disengaged, to the drive shaft of the internal combustion engine, whereby start-up is possible with a slipping friction clutch in the internal combustion engine driving operation, that is, with the internal combustion engine.

In contrast to this, the one input shaft can also be connected directly in a rotationally fixed manner, or via a torsional vibration damper, to the drive shaft of the internal combustion engine. In this case however, start-up is possible only in electric driving operation, that is, with the electric machine and with a gear wheel set of the electric motor force transfer branch. Because the direction of rotation of the electric machine can be reversed, a possibly present reverse gear wheel set in the manual transmission can be omitted, or this can be replaced by a further normal gear wheel set.

The other input shaft can be connected in a rotationally fixed manner directly to the rotor of the electric machine, or via a transmission step, which preferably has an underdrive transmission ratio, that is in drive connection with the rotor of the electric machine.

In order to attain a higher variability in the design of the transmission ratios of the gear wheel sets with the manual transmission, it can be provided that at least one common fixed gear is formed by two gear wheel sets disposed in a common radial plane, as a stepped gear. As a result, additionally, a lower profile shift results in the gear engagement of the two associated idler gears, which leads to less wear to the gears and to an improved smooth running of the manual transmission.

For improving the operating properties of the hybrid drive, with an engagement of the internal combustion engine via a friction clutch, particularly for allowing shifts under load in the electric driving operation, the one input shaft can additionally be in drive connection with the rotor of a second electric machine, which is disposed at the end of this input shaft outside of the transmission and is preferably implemented as a starter generator.

BRIEF DESCRIPTION OF THE DRAWINGS

For illustrating the invention, the description is accompanied by a drawing with exemplary embodiments. They show.

DETAILED DESCRIPTION OF THE PREFERRED EMBODIMENTS

Figure 21:
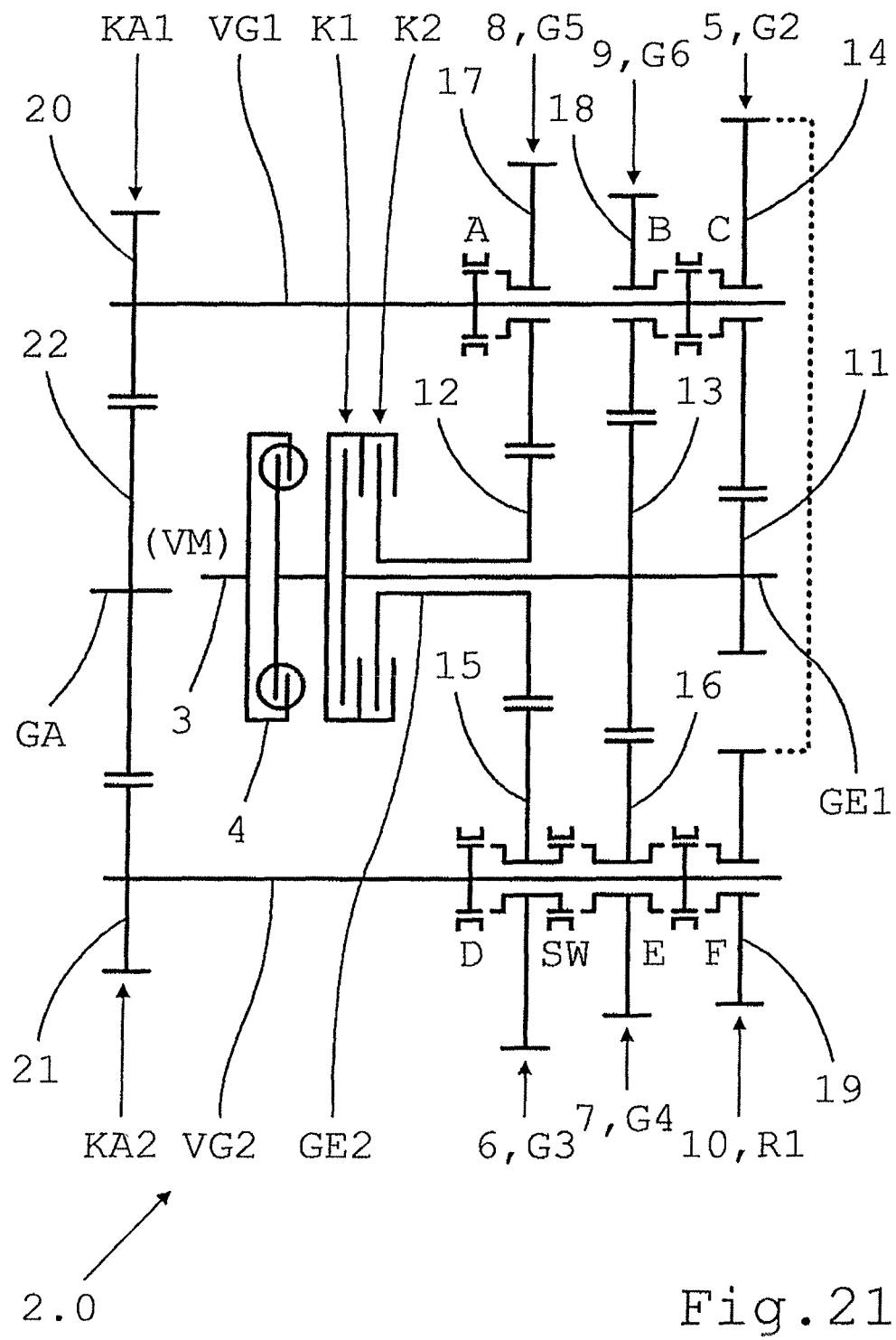

A schematic form of a double clutch transmission 2.0, known for example from the document DE 10 2007 049 271 A1, from which the following described manual transmissions 2.1 to 2.20 of the hybrid drive 1.1 to 1.8a according to the invention are derived, is shown in FIG. 21.

The double clutch transmission 2.0 has two coaxial input shafts GE1, GE2, two countershafts VG1, VG2 and one common output shaft GA. The first input shaft GE1 is disposed centrally within the second input shaft GE2, implemented as a hollow shaft. Both input shafts GE1, GE2, can each be connected on the input side, via an associated friction clutch K1 K2, to the drive shaft 3, provided with a torsional vibration damper 4, of an internal combustion engine VM, not shown in more detail. On the output side, both input shafts GE1, GE2 can be brought in drive connection, via a plurality of selectively shiftable gear wheel sets 5, 7, 9, 10, or 6, 8 with one of the two countershafts VG1, VG2, respectively. Both counter shafts VG1, VG2 are in drive connection, each via an output constant KA1, KA2, with the output shaft GA.

The gear wheel sets 5, 7, 9, 10, or 6, 8, each comprise a fixed gear 11, 13, or 12, disposed in a rotationally fixed manner on the associated input shaft GE1, GE2, and an idler gear 14, 16, 18, 19, or 15, 17, disposed rotateably on the respective countershaft VG1, VG2, that can be coupled thereto via an associated gear clutch A, B, C, D, E, F, wherein each of the gear wheel sets 5, 7, 9, 10, or 6, 8, are disposed in pairs in a common radial plane using a common fixed gear 11, 13, or 12.

The output constants KA1, KA2 each comprise a fixed gear 20, 21 disposed in a rotationally fixed manner on the associated counter shaft VG1, VG2, and an output gear 22 disposed in a rotationally fixed manner on the output shaft GA, wherein the output constants KA1, KA2 are disposed in a common radial plane using the common output gear 22.

A so-called winding-path shift element SW is disposed between the idler gears 15 and 16 of the two gear wheel sets 6 and 7, disposed on the second countershaft VG2, by means of which these can be coupled.

In FIG. 21 the two counter shafts VG1, VG2 are unfolded in the drawing plane about the center axis of the two input shafts GE1, GE2. Actually, in the axial view, the two counter shafts VG1, VG2, together with the two input shafts GE1, GE2, form a V-shaped arrangement. Consequently, and in contrast to the representation in FIG. 21, the output shaft GA is also actually disposed radially distanced from the internal combustion engine VM.

The gear wheel sets 5, 7, 9, 10 associated with the first input shaft GE1 presently form the even numbered forward gears G2, G4, G6 and the reverse gear R1. Here, the gear wheel set 10 of the reverse gear R1 uses the respective idler gear 14 for reversing the direction of rotation due to a gear engagement of the associated idler gear 19 with the idler gear 14 of the gear wheel set 5 associated with the forward gear G2, instead of a separate intermediate gear. The odd numbered forward gears G3, G5 are formed by the gear wheel sets 6 and 8 associated with the second input shaft GE2.

By engaging the winding-path shift element SW, two further (odd numbered) forward gears G1 and G7 and a further reverse gear R2 can be shifted as winding-path gears. With the winding-path shift element SW engaged, the power flow occurs, with forward gear G1 engaged by engaging the gear clutch C, from the second input shaft GE2 via the gear wheel sets 6, 7, 5 to the first counter shaft VG1. With the winding-path shift element SW engaged, the power flow occurs, with forward gear G7 engaged by engaging the gear clutch A, from the first input shaft GE1 via the gear wheel sets 7, 6, 8 to the first counter shaft VG1. With the winding-path shift element SW engaged, the power flow occurs, with reverse gear R2 engaged by engaging the gear clutch F, from the second input shaft GE2 via the gear wheel sets 6, 7, 5, 10 to the second counter shaft VG2.

Thus, the total of seven available forward gears and two reverse gears are combined in FIG. 21a in a tabular operating and shift pattern. In the table in FIG. 21a, the engaged, or closed state, of the friction clutches K1, K2, the gear clutches A, B, C, D, E, F and the winding-path shift element SW, for shifting the gears G1-G7, R1, R2 are each marked with an X.

Figure 1:
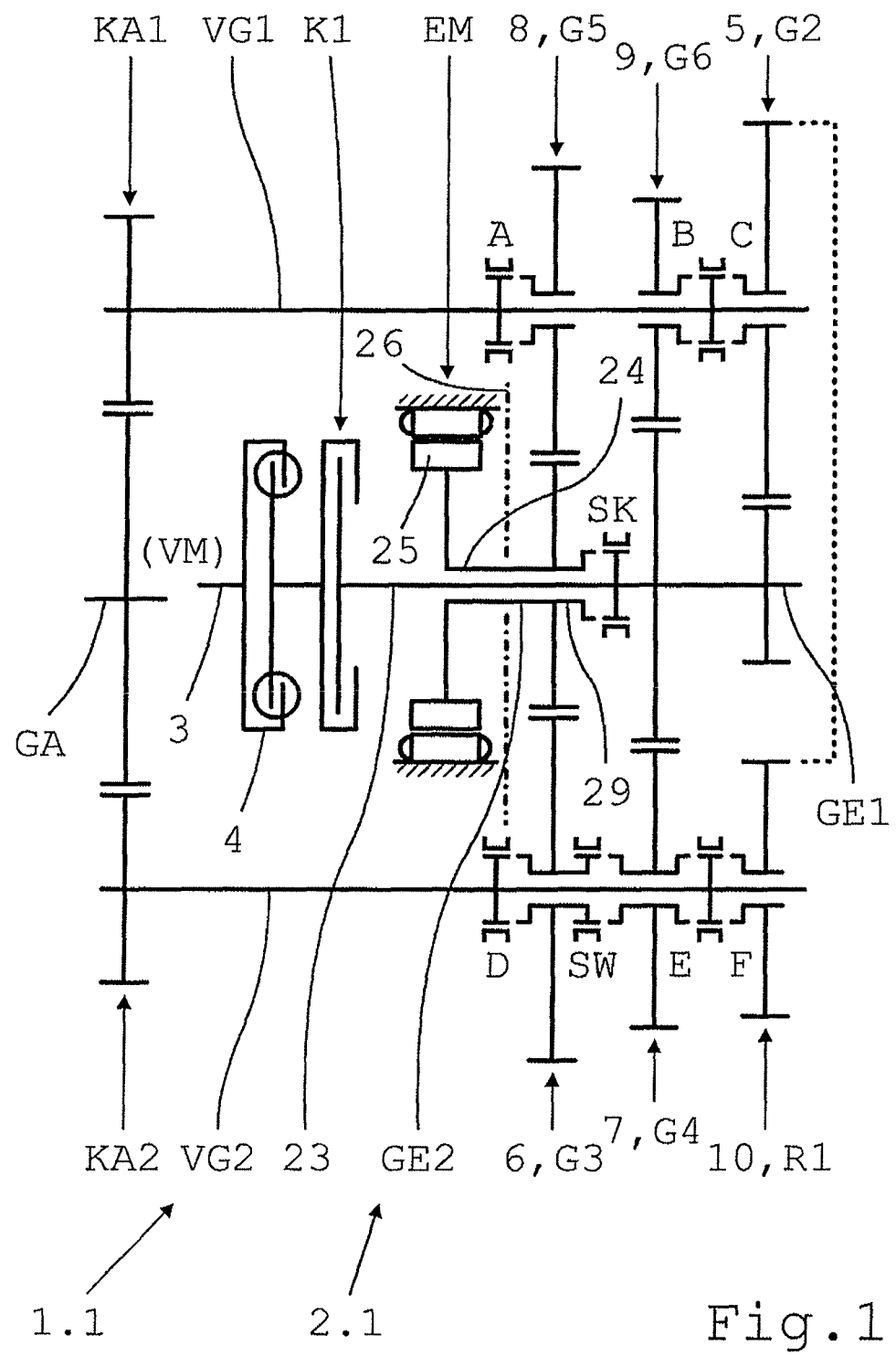
FIG. 1 a first hybrid drive of a motor vehicle with a manual transmission derived from a double clutch transmission according to FIG. 21, FIG. 1a an operating and shift pattern of the first hybrid transmission according to FIG. 1 for an internal combustion engine driving operation, in the form of a table, FIG. 2 a first modification of the first hybrid transmission according to FIG. 1, FIG. 3 a second modification of the first hybrid transmission according to FIG. 1, FIG. 4 a second hybrid drive of a motor vehicle with a manual transmission derived from a double clutch transmission according to FIG. 21, FIG. 4a an operating and shift pattern of the second hybrid transmission according to FIG. 4 for an internal combustion engine driving operation, in the form of a table, FIG. 5 a first modification of the second hybrid transmission according to FIG. 4, FIG. 6 a second modification of the second hybrid transmission according to FIG. 4, FIG. 7 a third hybrid drive of a motor vehicle with a manual transmission derived from a double clutch transmission according to FIG. 21, FIG. 7a an operating and shift pattern of the third hybrid transmission according to FIG. 7 for an internal combustion engine driving operation, in the form of a table, FIG. 8 a modification of the third hybrid transmission according to FIG. 7, FIG. 9 a fourth hybrid drive of a motor vehicle with a manual transmission derived from a double clutch transmission according to FIG. 21, FIG. 9a an operating and shift pattern of the fourth hybrid transmission according to FIG. 9 for an internal combustion engine driving operation, in the form of a table, FIG. 10 a modification of the fourth hybrid transmission according to FIG. 9, FIG. 11 a fifth hybrid drive of a motor vehicle with a manual transmission derived from a double clutch transmission according to FIG. 21, FIG. 11a an operating and shift pattern of the fifth hybrid transmission according to FIG. 11 for an internal combustion engine driving operation, in the form of a table, FIG. 12 a first modification of the fifth hybrid transmission according to FIG. 11, FIG. 13 a second modification of the fifth hybrid transmission according to FIG. 11, FIG. 14 a sixth hybrid drive of a motor vehicle with a manual transmission derived from a double clutch transmission according to FIG. 21, FIG. 14a an operating and shift pattern of the sixth hybrid transmission according to FIG. 14 for an internal combustion engine driving operation, in the form of a table, FIG. 15 a first modification of the sixth hybrid transmission according to FIG. 14, FIG. 16 a second modification of the sixth hybrid transmission according to FIG. 14, FIG. 17 a seventh hybrid drive of a motor vehicle with a manual transmission derived from a double clutch transmission according to FIG. 21, FIG. 17a an operating and shift pattern of the seventh hybrid transmission according to FIG. 17 for an internal combustion engine driving operation, in the form of a table, FIG. 18 a modification of the seventh hybrid transmission according to FIG. 17, FIG. 19 an eighth hybrid drive of a motor vehicle with a manual transmission derived from a double clutch transmission according to FIG. 21, FIG. 19a an operating and shift pattern of the eighth hybrid transmission according to FIG. 19 for an internal combustion engine driving operation, in the form of a table, FIG. 20 a modification of the eighth hybrid transmission according to FIG. 19, FIG. 21 a double clutch transmission with two input shafts, two countershafts, and a common output shaft, and FIG. 21a an operating and shift pattern of the double clutch transmission according to FIG. 21 in the form of a table.

A first hybrid drive 1.1 according to FIG. 1, following the design principle of the invention, comprises a manual transmission 2.1 derived from the double clutch transmission 2.0 according to FIG. 21, is created sparing expenditure in that only the centrally disposed first input shaft GE1 can be connected at the end 23 thereof, outside of the transmission, to the drive shaft 3 of the internal combustion engine VM, via a friction clutch K1 that can be engaged or disengaged. In contrast, the second input shaft GE2, constructed as a hollow shaft and disposed coaxially over the first input gear GE1, is connected at the end 24 thereof, outside of the transmission, directly to the rotor 25 of an electric machine EM that can be operated as a motor or as a generator.

Because the two input shafts GE1, GE2 presently, as with the double clutch transmission 2.0 according to FIG. 21, extend axially out of the same side of an end wall of the housing 26 of the manual transmission 2.1, the electric machine EM is disposed more or less axially adjacent to the internal combustion engine VM, instead of the second friction clutch K2 of the double clutch transmission 2.0. Additionally, for coupling the two input shafts GE1, GE2, a so-called coupling shift element SK is provided that is presently disposed within the manual transmission 2.1 between the end 29 of the second input shaft GE2, inside of the transmission, implemented as a hollow shaft, and the central first input shaft GE1.

The gears G2-G7, R1, available for an internal combustion engine driving operation, are compiled in FIG. 1a in a tabular operating and shift pattern, in which the engaged, or closed state, of the friction clutch K1, the gear clutches A-F, the winding-path shift element SW, and the coupling shift element SK for shifting the gears G1-G7, R1 are each marked with an X. Accordingly, in internal combustion engine driving operation, in comparison to the double clutch transmission 2.0 according to FIG. 21, all gears G2-G7, R1, except the first forward G1 and the second reverse gear R2, are available to the hybrid drive 1.1.

In contrast, in electric driving operation of the hybrid drive 1.1, with the friction clutch K1 disengaged, all other gears G1-G6, R1, R2, except the seventh forward gear G7, are available, wherein the transmission-side part of the friction clutch K1, with the coupling shift element SK disengaged, does not also rotate in the third and fifth gear G3, G5.

In hybrid driving operation, the electric machine EM, with the coupling shift element SK disengaged in the third or fifth forward G3, G5, can be operated as a motor for supporting the internal combustion engine VM, or as a generator for charging an electric energy store. With the coupling shift element SK engaged, this can occur using an arbitrary gear G2-G6, R1 with the exception of the winding-path gears G1, G7, R2 (SW disengaged). A further coupling of the two input shafts GE1, GE2 can be produced by engaging the winding-path shift element SW (SK disengaged), which advantageously leads to a higher rotational speed of the electric machine EM in generator mode, compared to the internal combustion engine VM.

Figure 2:
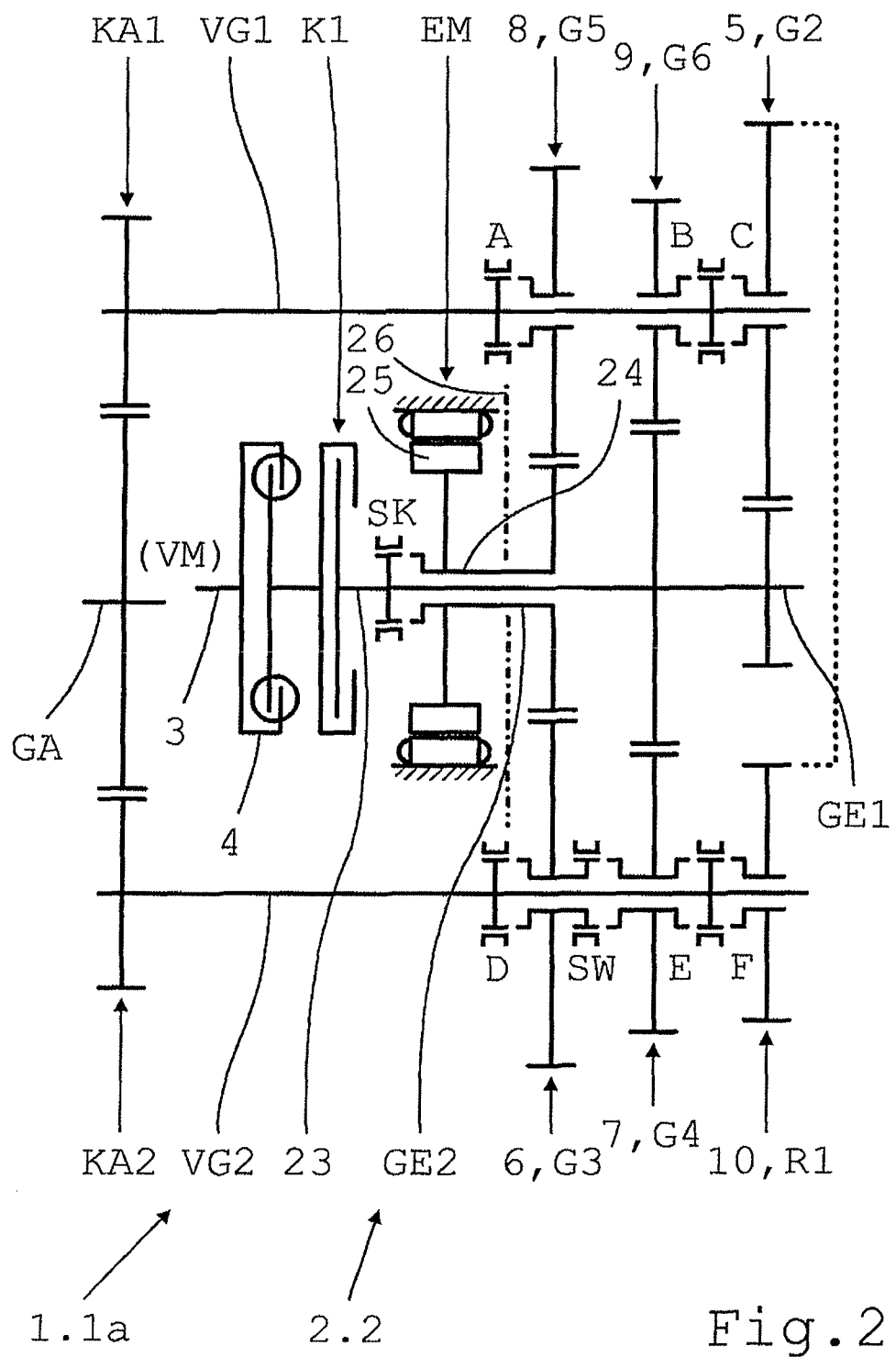

With a hybrid drive train 1.1a, depicted in FIG. 2, which represents a first modification of the first hybrid drive train 1.1 according to FIG. 1 and has the same functional possibilities thereto; in contrast thereto, only the coupling shift element SK is now disposed outside of the manual transmission 2.2 between the end 24 of the second input shaft GE2, outside of the transmission, implemented as a hollow shaft and the central first input shaft GE1.

Figure 3:
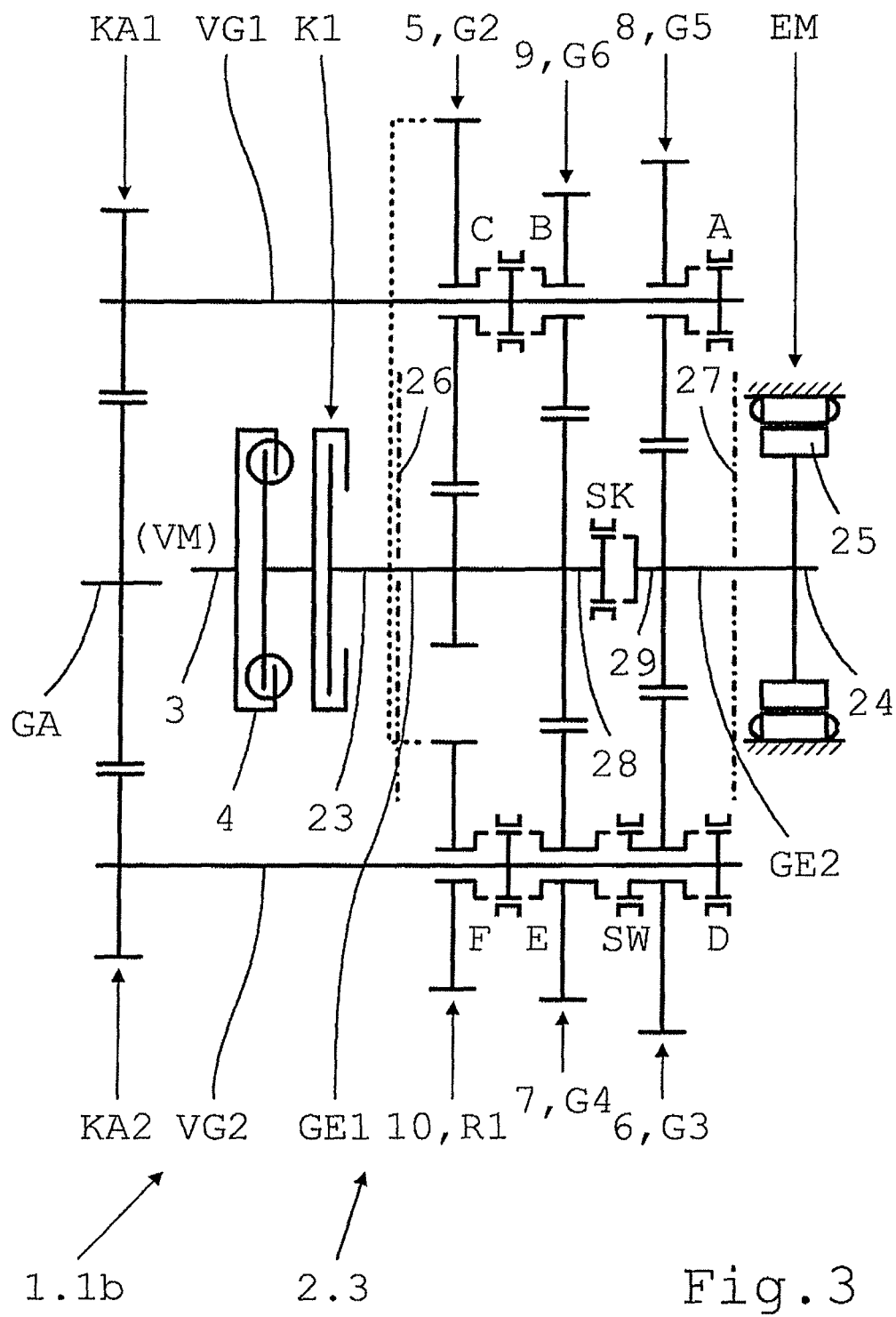

A hybrid drive train 1.1b, depicted in FIG. 3, which represents a second modification of the first hybrid drive train 1.1 according to FIG. 1 and is functionally equivalent thereto, has greater differences in contrast to the two previously described hybrid drive trains 1.1 and 1.1a according to the FIGS. 1 and 2. Thus, compared to the arrangement in the manual transmission 2.1 from FIG. 1, the gear wheel sets 5 to 10 are now disposed axially mirrored, and the second input shaft GE2 is disposed axially adjacent to the first input shaft GE1 and extends axially out of an opposite end wall 27 of the housing of the manual transmission 2.3. Accordingly, the electric machine EM is now disposed on the side of the manual transmission 2.3 axially across from the internal combustion engine VM, and the second input shaft GE2 is connected at the end 24 thereof, outside of the transmission, directly to the rotor 25 of the electric machine EM. The coupling shift element SK is now disposed within the manual transmission 2.3 between the ends 28, 29 of the two input shafts GE1, GE2, inside of the transmission.

Figure 4:
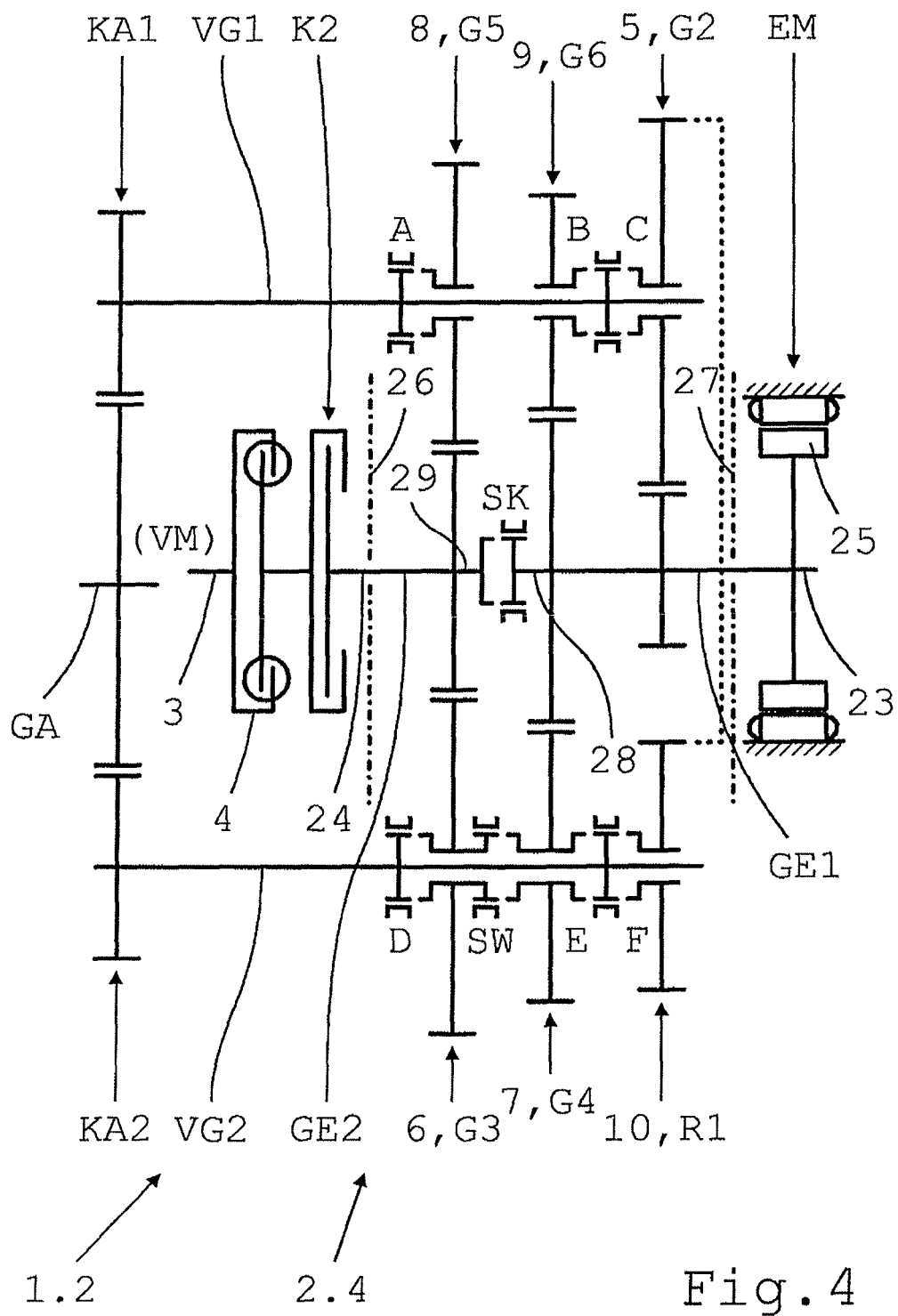

A second hybrid drive 1.2 according to FIG. 4, following the design principle of the invention, comprises a manual transmission 2.4 derived from the double clutch transmission 2.0 according to FIG. 21, is created in that only the second input shaft GE2 can be connected at the end 24 thereof, outside of the transmission, to the drive shaft 3 of the internal combustion engine VM, via a second friction clutch K2 that can be engaged and disengaged, and that the first input shaft GE1, now disposed axially adjacent to the second input shaft GE1, extends out of the respectively axially opposite end wall of the housing 27 of the manual transmission 2.4, and is connected at the end 23 outside of the transmission, directly to the rotor 25 of the electric machine EM. For coupling the two input shafts GE1 GE2, again a coupling shift element SK is provided that is presently disposed within the manual transmission 2.4 between the ends 28, 29 of the two input shafts GE1, GE2, inside of the transmission.

The gears G1-G6, R1, R2, available for an internal combustion engine driving operation, are compiled in FIG. 4a in a tabular operating and shift pattern, in which the engaged, or closed state, of the friction clutches K2, the gear clutches A to F, the winding-path shift element SW, and the coupling shift element SK for shifting the gears G1-G6, R1, R2 are each marked with an X.

Accordingly, in internal combustion engine driving operation, in comparison to the double clutch transmission 2.0 according to FIG. 21, all gears G1-G6, R1, R2 except the seventh forward G7, are available to the hybrid drive 1.2. In contrast, in the electric driving operation of the hybrid drive 1.2, with the friction clutch K2 disengaged, all gears G2-G7, R1, except the first forward gear G1 and the second reverse gear R2, are available, wherein the transmission-side part of the friction clutch K2, with the coupling shift element SK disengaged, does not also rotate in one of the gears, G2, G4, G6 and R1. In hybrid driving operation, the electric machine EM, with the coupling shift element SK disengaged in one of the gears G2, G4, G6 and R1, can be operated as a motor for supporting the internal combustion engine VM or as a generator for charging an electric energy store. With the coupling shift element SK engaged, this can also occur using the third or fifth forward gear G3, G5. A further coupling of the two input shafts GE1, GE2 can additionally be produced by engaging the winding-path shift element SW (SK disengaged), which is disadvantageously connected, however, with a lower rotational speed of the electric machine EM, compared to the internal combustion engine VM.

Figure 5:
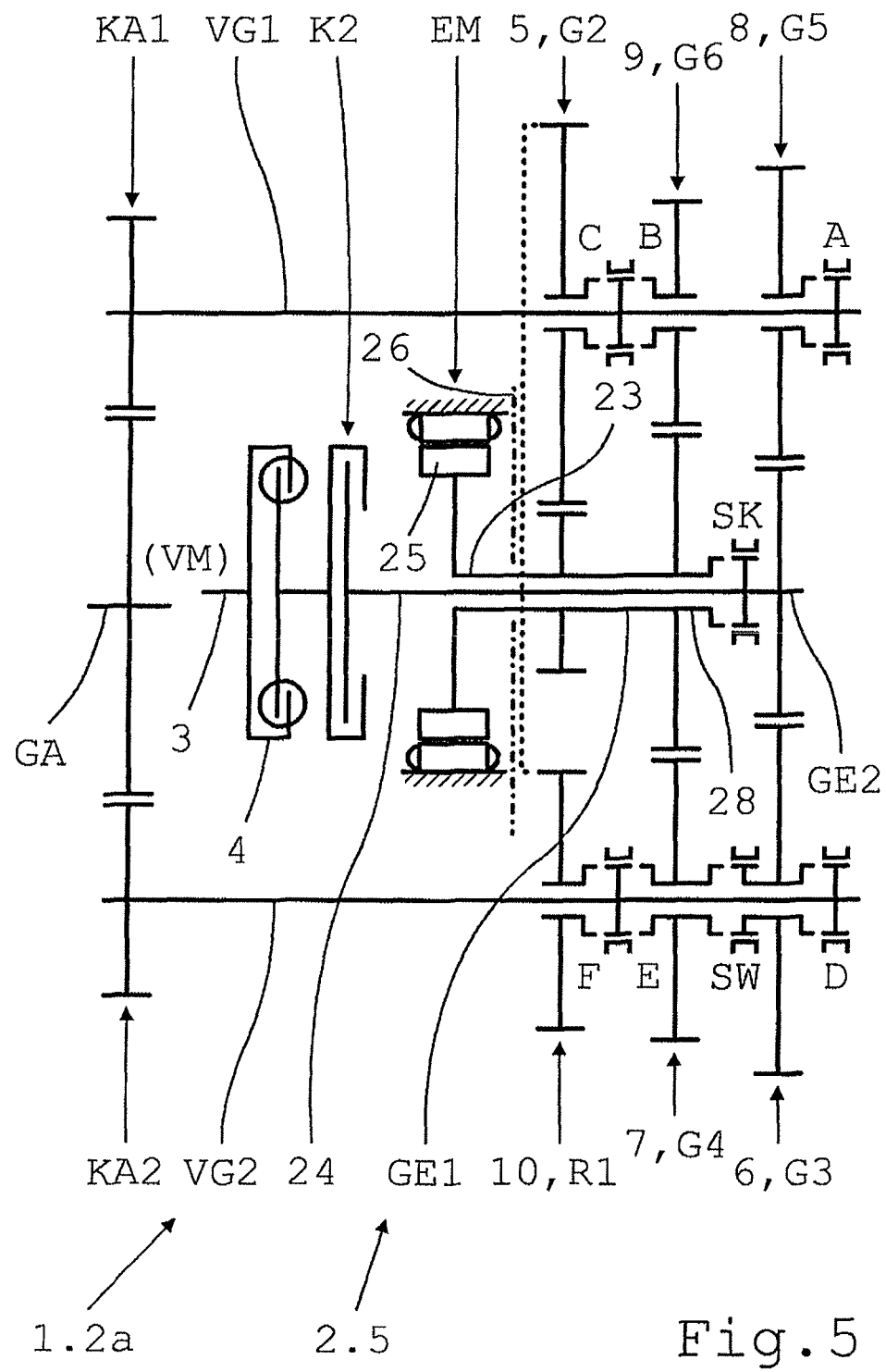

With a hybrid drive train 1.2a, depicted in FIG. 5, which represents a first modification of the second hybrid drive train 1.2 according to FIG. 4 and is functionally equivalent thereto, the gear wheel sets 5 to 10 are disposed axially mirrored with respect to the arrangement in FIG. 4, and the first input shaft GE1 is implemented as a hollow shaft and disposed coaxially over the second input shaft GE2, and extends axially out of the same end wall 26 of the housing of the manual transmission 2.5 as the second input shaft GE2. Accordingly, the electric machine EM is now disposed axially on the same side of the manual transmission 2.5 as the internal combustion engine VM, and the first input shaft GE1 is directly connected at the end 23 thereof, outside of the transmission, to the rotor 25 of the electric machine EM. The coupling shift element SK is now disposed within the manual transmission 2.5 between the end 28 of the first input shaft GE1, inside of the transmission, implemented as a hollow shaft and the central second input shaft GE2.

Figure 6:
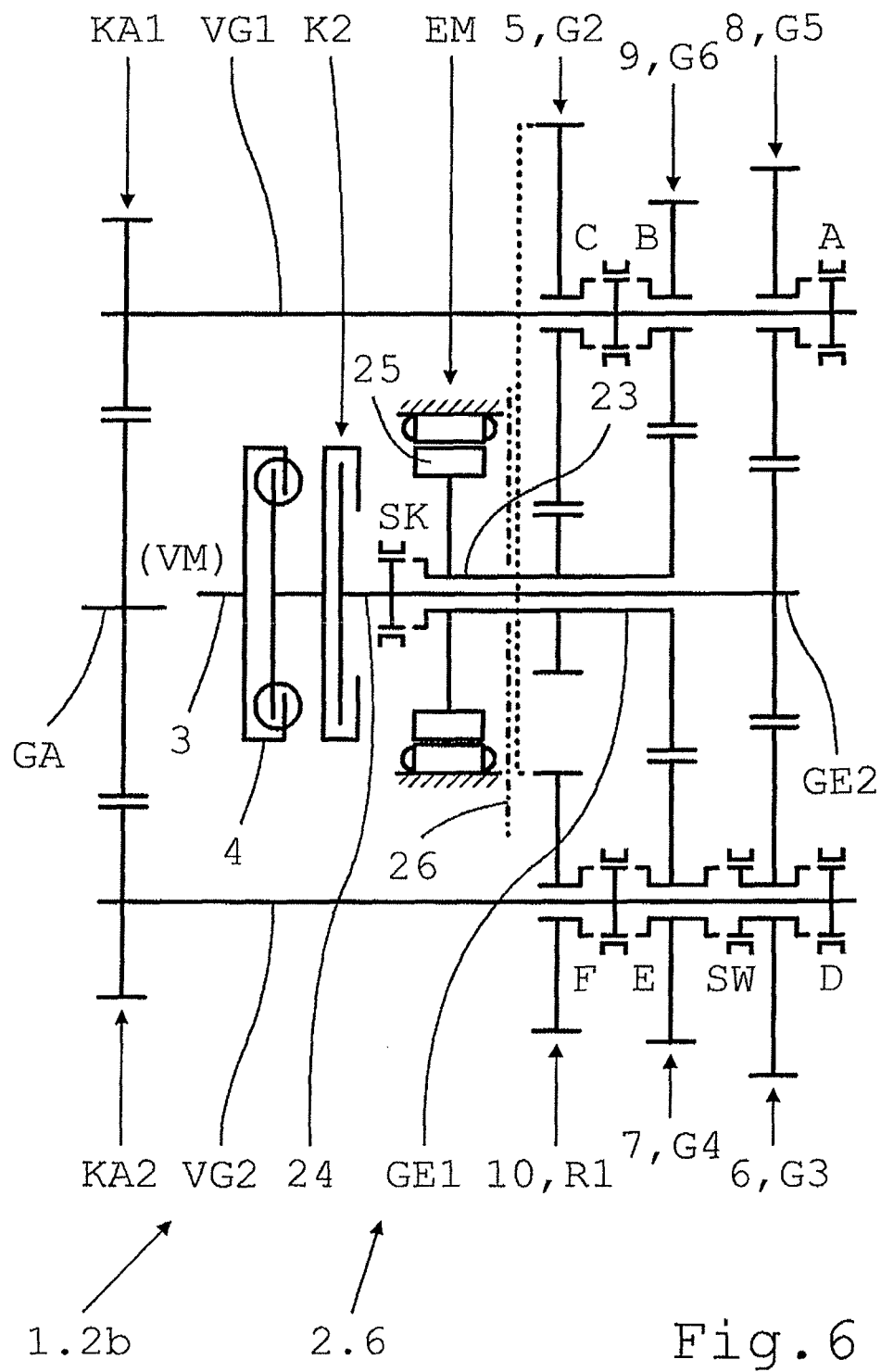

A hybrid drive train 1.2b, depicted in FIG. 6, which represents a second modification of the second hybrid drive train 1.2 according to FIG. 4 and is functionally equivalent thereto, differs from the previously described hybrid drive trains 1.2a according to FIG. 5 only in that the coupling shift element SK, now outside of the manual transmission 2.6, is disposed between the end 23, outside of the transmission, of the first inputs shaft GE1 implemented as a hollow shaft and the central second input shaft GE2.

Figure 7:
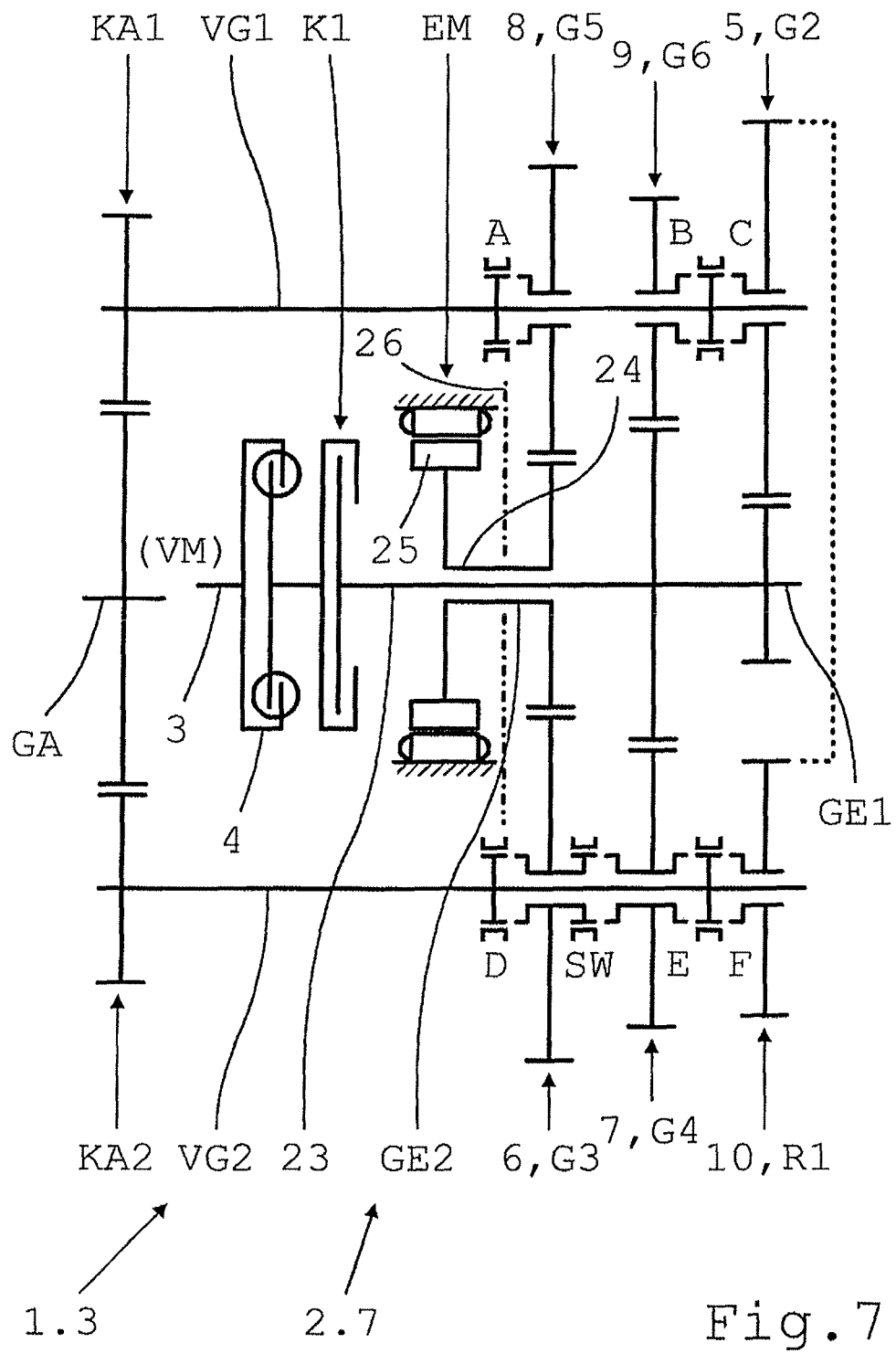

A third hybrid drive 1.3 according to the invention, according to FIG. 7 which comprises a manual transmission 2.7 derived from the double clutch transmission 2.0 according to FIG. 21, has largely the same design as that of the first hybrid drive 1.1 according to FIG. 1, and differs therefrom only in that a coupling shift element SK for coupling the two input shafts GE1, GE2 is omitted. Accordingly, for an internal combustion engine driving operation only the gears G2, G4, G6, R1 associated with the first input shaft GE1, and the seventh forward gear G7 acting as a winding-path gear attached at the first input shaft GE1, are available.

Figure 7A:
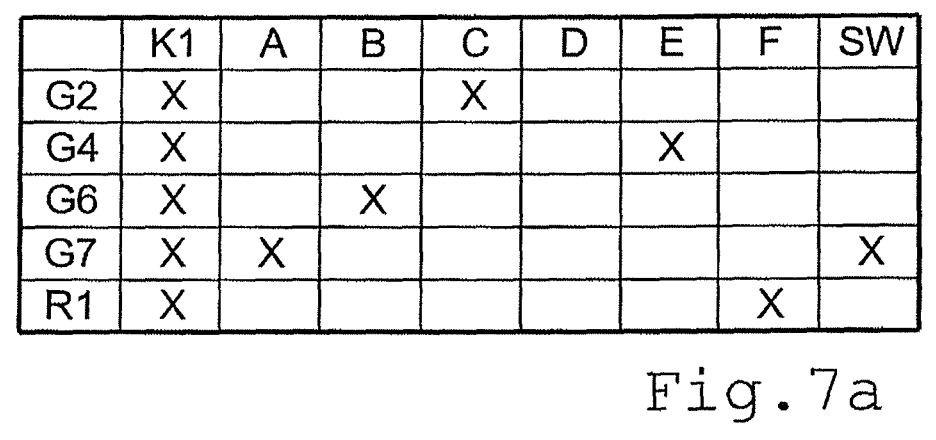

The respective gears G2, G4, G6, G7, R1 are compiled in FIG. 7a in a tabular operating and shift pattern, in which the engaged, or closed state, of the friction clutch K1, the gear clutches A to F, the winding-path shift element SW, and the winding-path shift element SK for shifting the gears G2, G4, G6, G7, R1, are each marked with an X.

In electric driving operation of the hybrid drive 1.3, with the friction clutch K1 disengaged, the gears G3 and G5 assigned to the second input shaft GE2 and the gears G2 and R2 acting as winding-path gears attached at the second input shaft GE2, are available, wherein the transmission-side part of the friction clutch K1 does not rotate along with the engaged third or fifth forward gear G3, G5.

In hybrid driving operation, the electric machine EM with the engaged third or fifth forward gear G3, G5 can be operated as a motor for supporting the internal combustion engine VM, or as a generator for charging an electric energy store. A coupling of the two inputs shafts GE1, GE2 can be produced also by engaging the winding-path shift element SW, which advantageously leads to a higher rotational speed of the electric machine EM, compared to the internal combustion engine VM.

Figure 8:
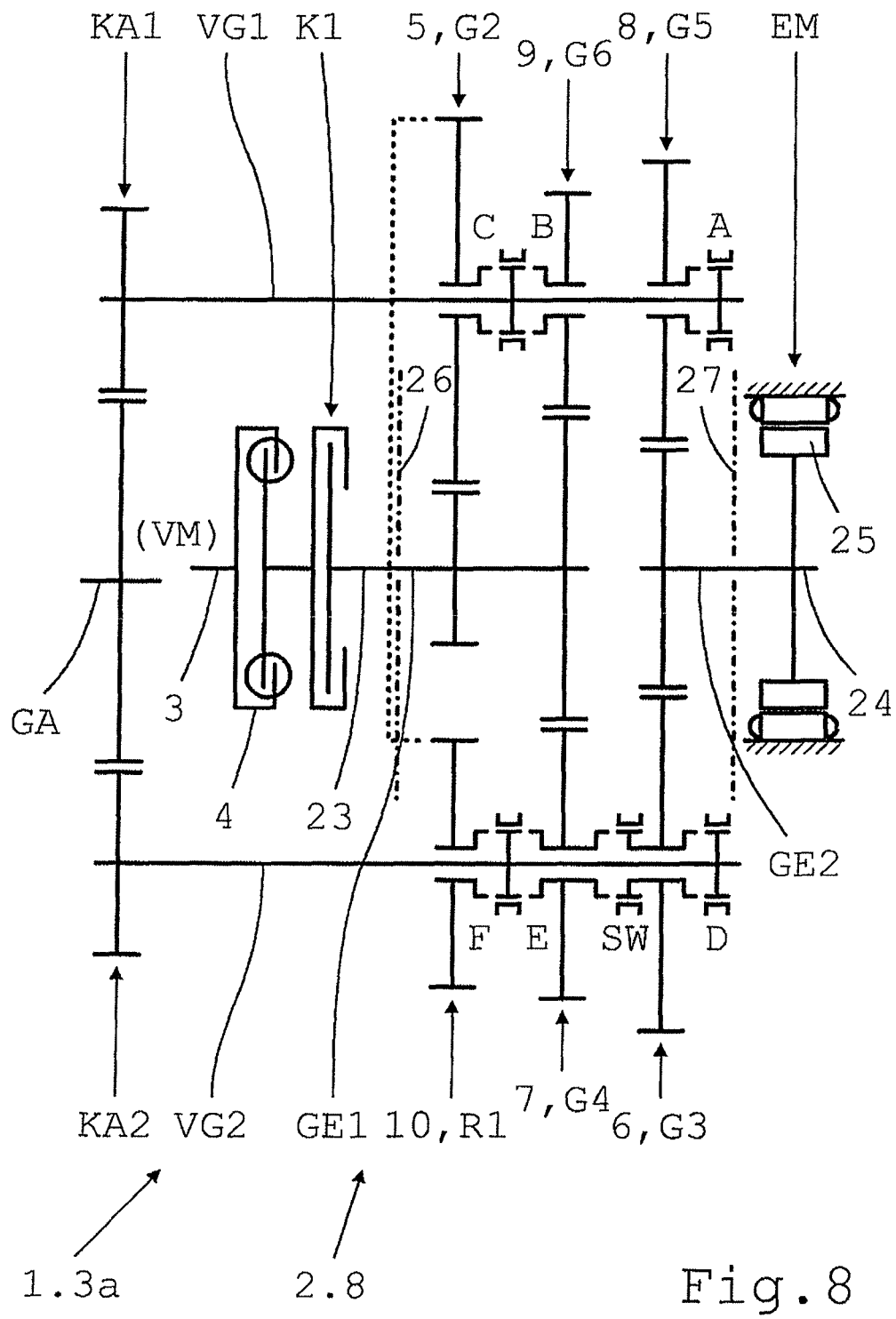

With a hybrid drive train 1.3a, depicted in FIG. 8, which is a modification of the third hybrid drive train 1.3 according to FIG. 7 and has the same functional modes thereto, in contrast thereto, the gear wheel sets 5 to 10 are disposed axially mirrored with respect to the arrangement in the manual transmission 2.7 of FIG. 7, and the second input shaft GE2 is disposed axially adjacent to the first input shaft GE1 and extends axially out of the opposite end wall 27 of the housing of the manual transmission 2.8. Accordingly, the electric machine EM is now disposed on the side of the manual transmission 2.8 axially across from the internal combustion engine VM, and the second input shaft GE2 is connected at the end 24, outside of the transmission, thereof directly to the rotor 25 of the electric machine EM.

Figure 9:
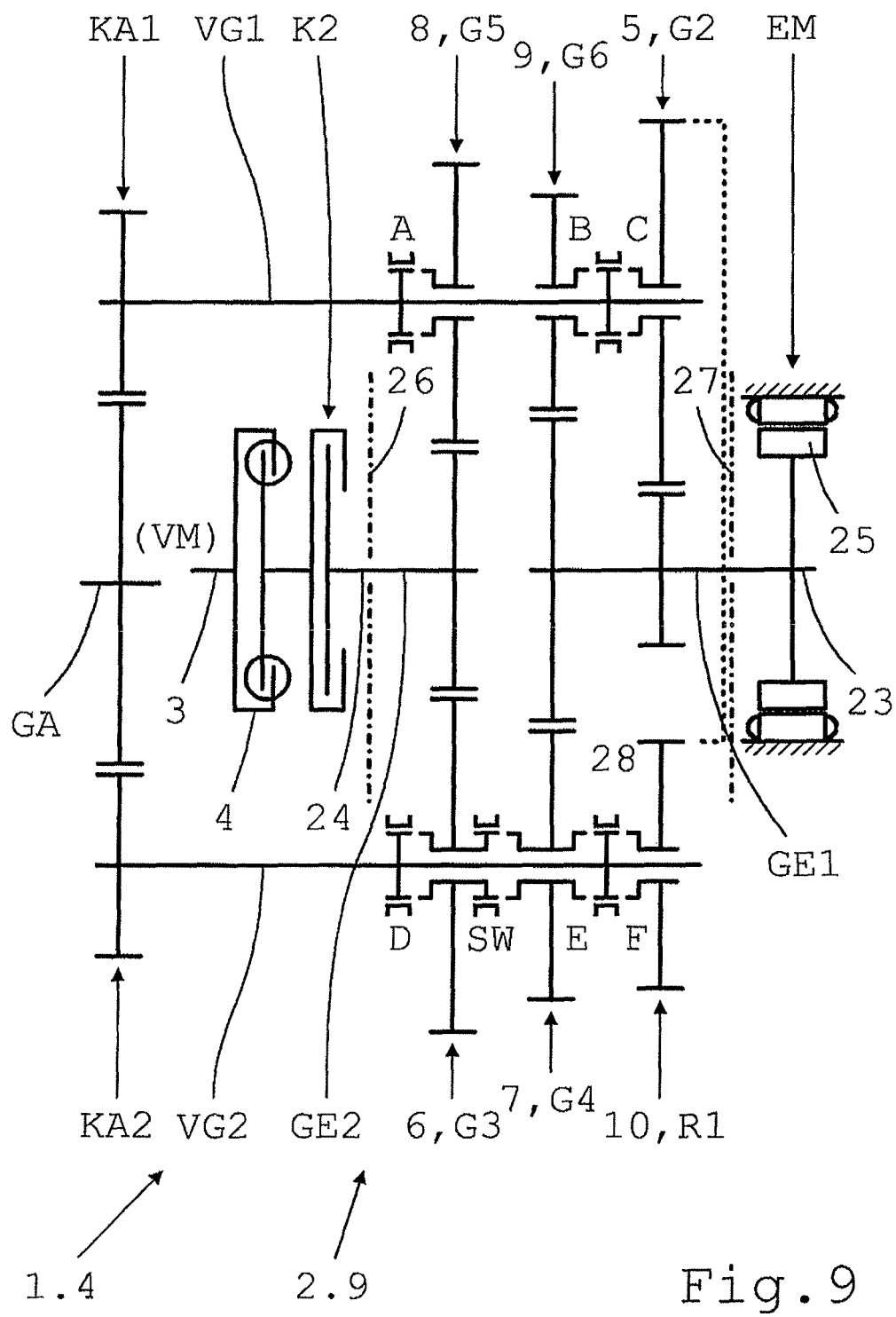

A fourth hybrid drive 1.4 according to the invention, according to FIG. 9 which comprises a manual transmission 2.9 derived from the double clutch transmission 2.0 according to FIG. 21, has largely the same design as that of the second hybrid drive 1.2 according to FIG. 4, and differs therefrom only in that a coupling shift element SK for coupling the two input shafts GE1, GE2 is omitted. Accordingly, for an internal combustion engine driving operation, only the gears G3, G5 assigned to the second input shaft GE2, and the gears G2, R2 acting as winding-path gears, attached at the second input shaft GE2, are available. However, by simultaneously engaging the gear clutch B and the winding-path shift element SW, a further forward gear G4* can be shifted as a winding-path gear, which was not used up till now, and whose transmission ratio corresponds approximately to that of the fourth gear G4.

Figure 9A:
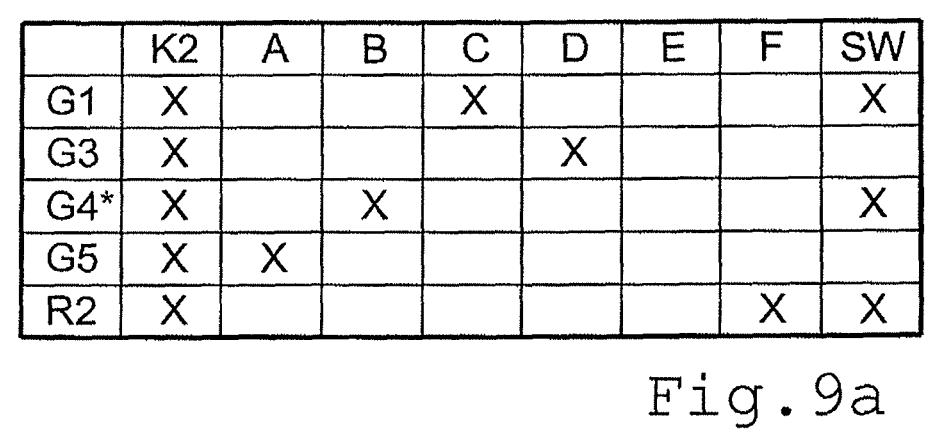

The respective gears G1, G3, G4*, G5, R2 are compiled in FIG. 9a in a tabular operating and shift pattern, in which the engaged, or closed state, of the friction clutch K2, the gear clutches A to F, the winding-path shift element SW, for shifting the gears G1, G3, G4*, G5, R2 are each marked with an X. In electric driving operation of the hybrid drive 1.4, with the friction clutch K2 disengaged, the gears G2, G4, G6 and R1 assigned to the first input shaft GE1, and the seventh forward gear G7 acting as a winding-path gear attached at the first input shaft GE1, are available, wherein the transmission-side part of the friction clutch K2 does not rotate along in the gears G2, G4, G6, R1.

In hybrid driving operation, the electric machine EM, with one of the gears G2, G4, G6, R1 engaged, can be operated as a motor for supporting the internal combustion engine VM, or as a generator for charging an electric energy store. A further coupling of the two input shafts GE1, GE2 can additionally be produced by engaging the winding-path shift element SW, which disadvantageously is connected with a lower rotational speed of the electric machine EM, compared to the internal combustion engine VM.

Figure 10:
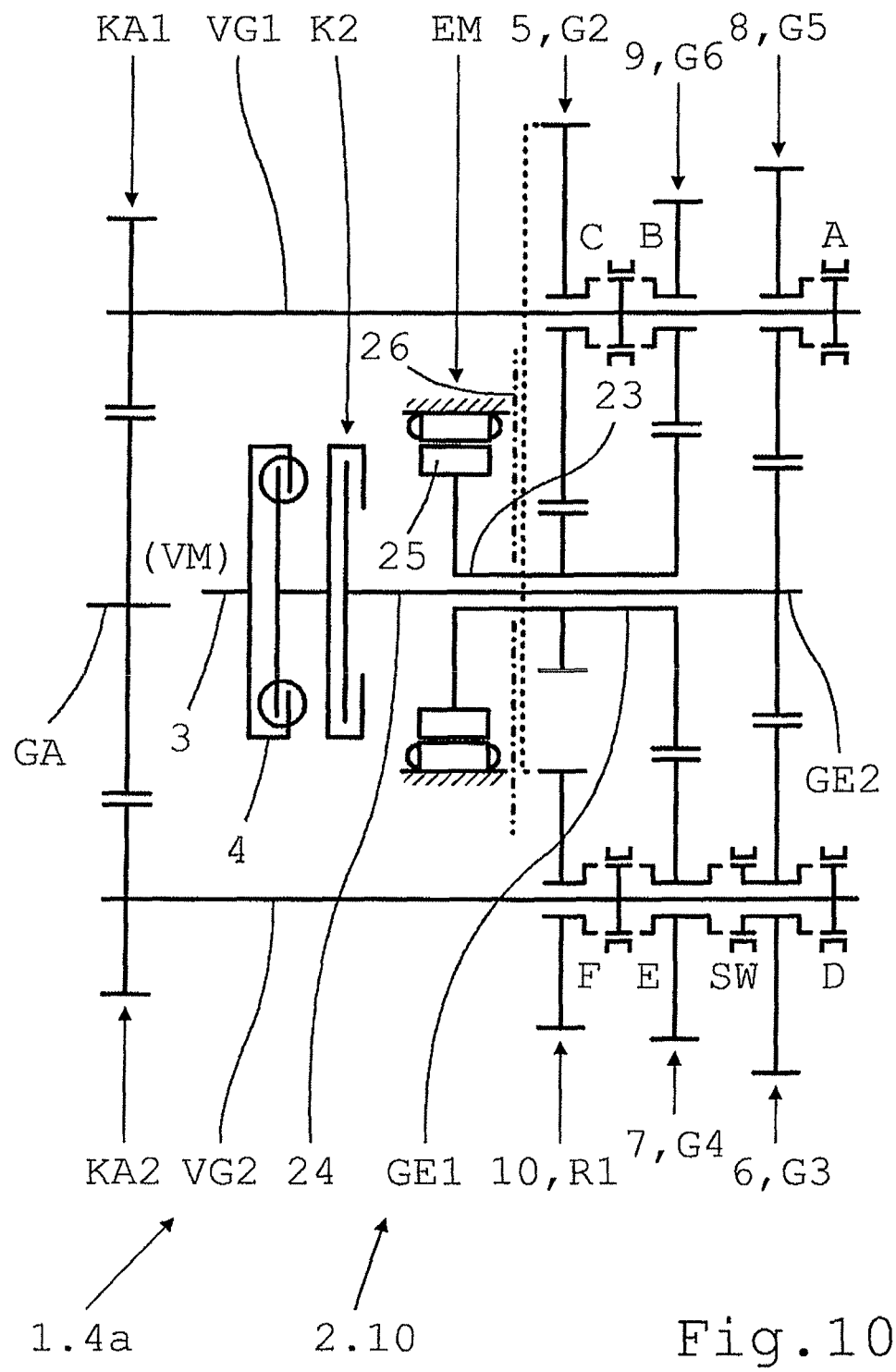

With a hybrid drive train 1.4a, depicted in FIG. 10, which is a modification of the fourth hybrid drive train 1.4 according to FIG. 9 and is functionally equivalent thereto, the gear wheel sets 5 to 10 are disposed axially mirrored with respect to the arrangement in the manual transmission 2.9 of FIG. 9, and the first input shaft GE1 is implemented as a hollow shaft and is disposed coaxially over the second input shaft GE2 and extends axially out of the same end wall 26 of the housing of the manual transmission 2.10 as the second input shaft GE2. Accordingly, the electric machine EM is now disposed axially on the same side of the manual transmission 2.10 as the internal combustion engine VM, and the first input shaft GE1 is connected directly at the end 23 thereof, outside of the transmission, to the rotor 25 of the electric machine EM.

Figure 11:
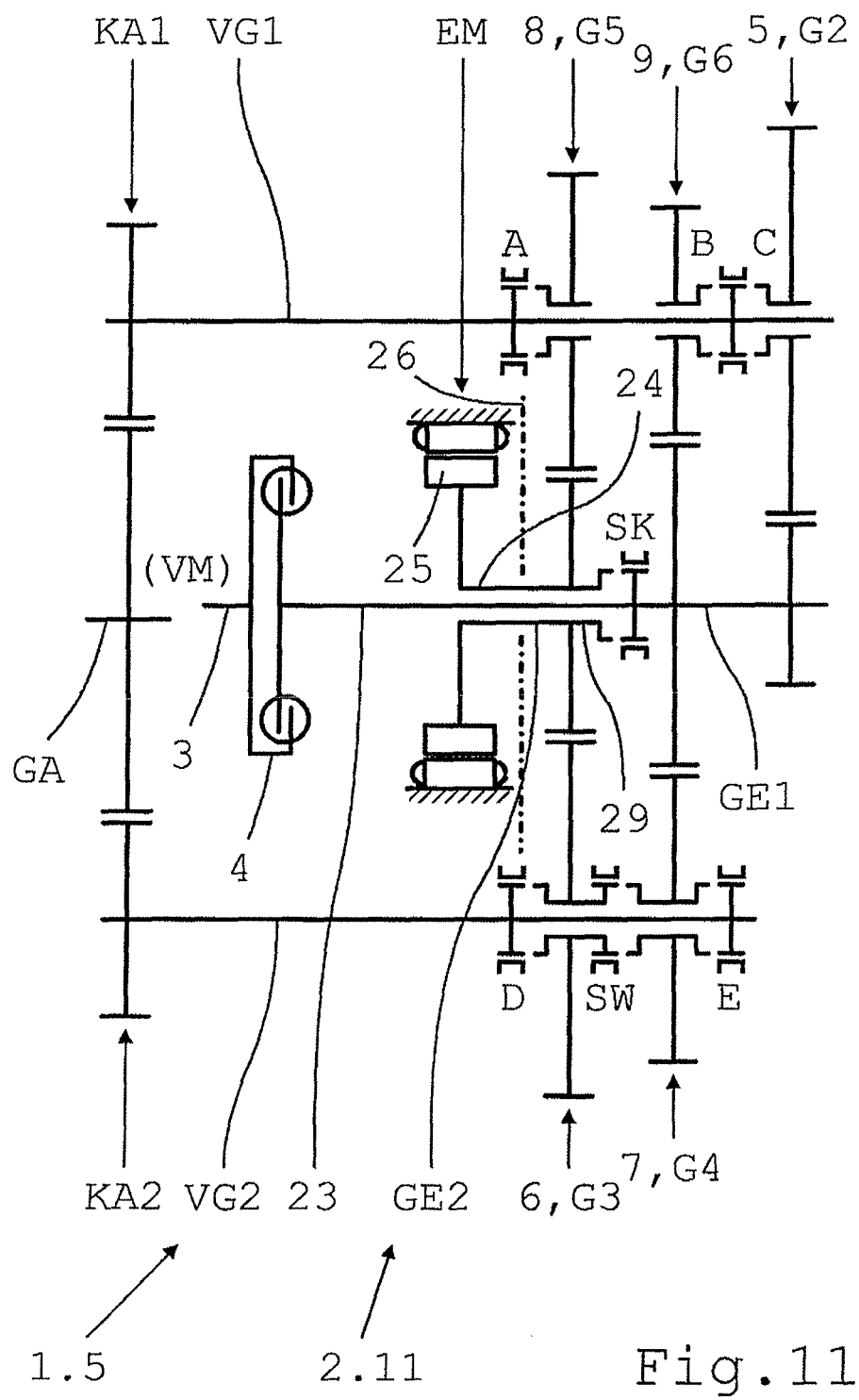

A fifth hybrid drive 1.5 according to the invention, according to FIG. 11 which comprises a manual transmission 2.11 derived from the double clutch transmission 2.0 according to FIG. 21, has largely the same design as that of the second hybrid drive 1.1 according to FIG. 1 and differs therefrom only in that a friction clutch K1 for connecting the internal combustion engine VM to the first input shaft GE1 is omitted. Thus, the first input shaft GE1 is connected in a rotationally fixed manner at the end 23 thereof, outside of the transmission, (via the torsional vibration damper 4) directly to the drive shaft 3 of the internal combustion engine VM. Accordingly, start-up can only occur using the electric motor. Because the direction of rotation of the electric machine EM can be reversed, a reverse gear wheel set can be omitted. Therefore, in the manual transmission 2.11 according to FIG. 11, in contrast to the manual transmission 2.1 according to FIG. 1, the idler gear 19 and the associated gear clutch F of the reverse gear R1 are omitted.

Figure 11A:
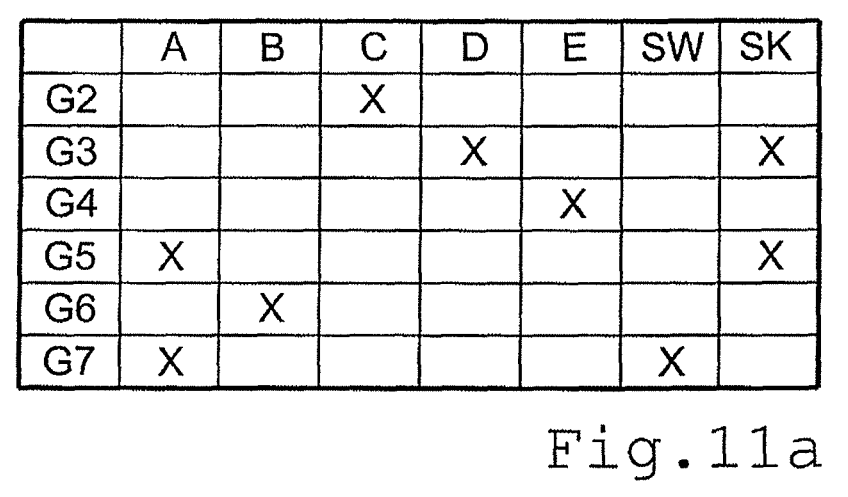

For an internal combustion engine driving operation, all forward gears G2 to G7, except for the first forward gear G1, are available. The corresponding gears G2 to G7, are combined in FIG. 11a in a tabular operating shift pattern, in which the engaged, or closed state, of the gear clutches A-E, the winding-path shift element SW, and the coupling shift element SK for shifting the gears G2 to G7 are each marked with an X.

In electric driving operation of the hybrid drive 1.5 according to FIG. 11, only the gears G3 and G5 assigned to the second input shaft GE2 are available. In hybrid driving operation, the electric machine EM with selective engagement of the third or fifth forward gear G3, G5, or with an engaged coupling shift element SK, can be operated as a motor for supporting the internal combustion engine VM, or as a generator for charging an electric energy store. A further coupling of the two input shafts GE1, GE2 can also be produced by engaging the winding-path shift element SW (SK disengaged), which advantageously leads to a higher rotational speed of the electric machine EM, compared to the internal combustion engine VM.

Figure 12:
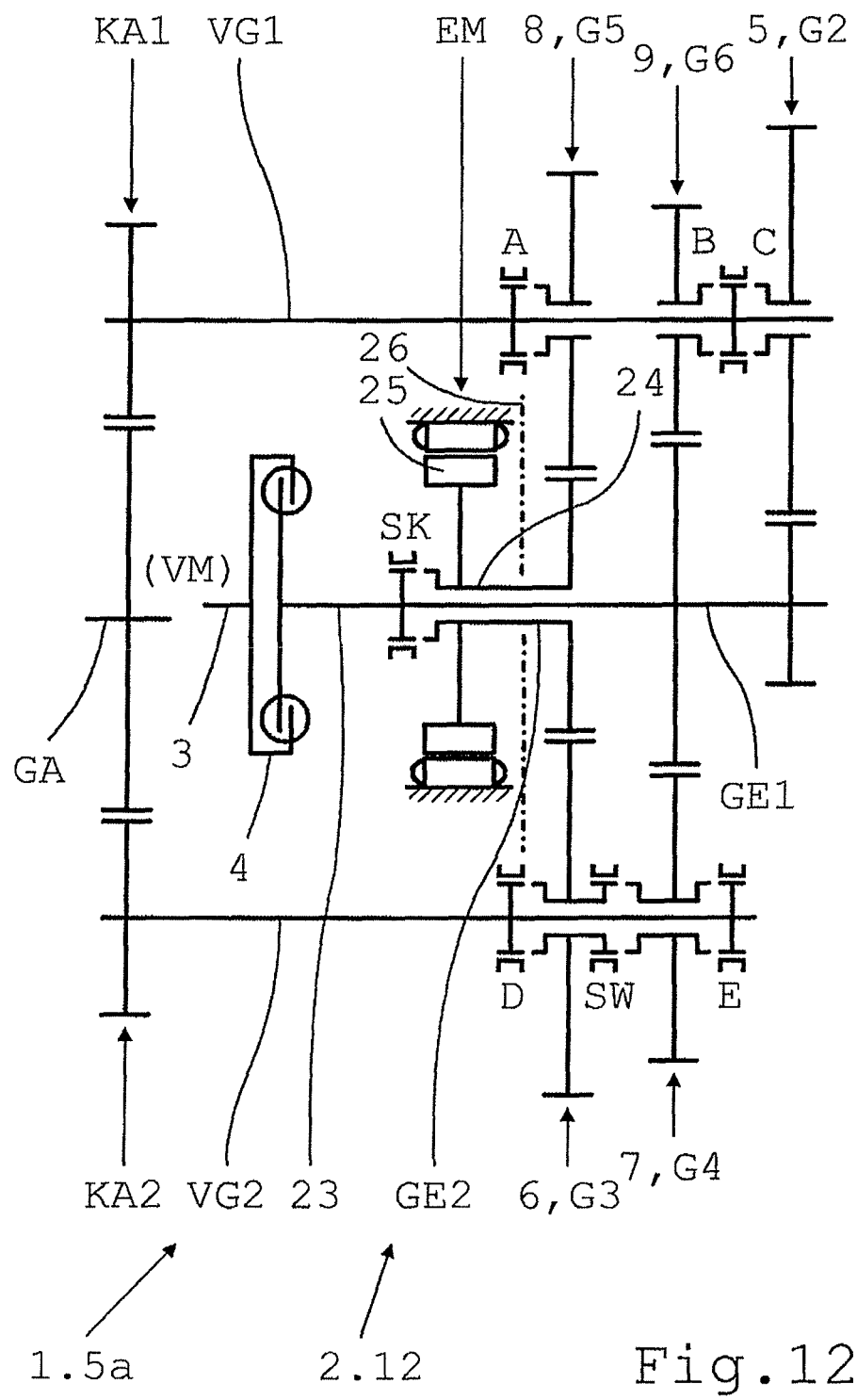

With the hybrid drive train 1.5a, depicted in FIG. 12, which is a first modification of the fifth hybrid drive train 1.5 according to FIG. 11 and has the same function possibilities thereto, in contrast thereto, only the coupling shift element SK is now disposed outside of the manual transmission 2.12 between the end 24 of the second input shaft GE2, outside of the transmission, implemented as a hollow shaft and the central first input shaft GE1.

Figure 13:
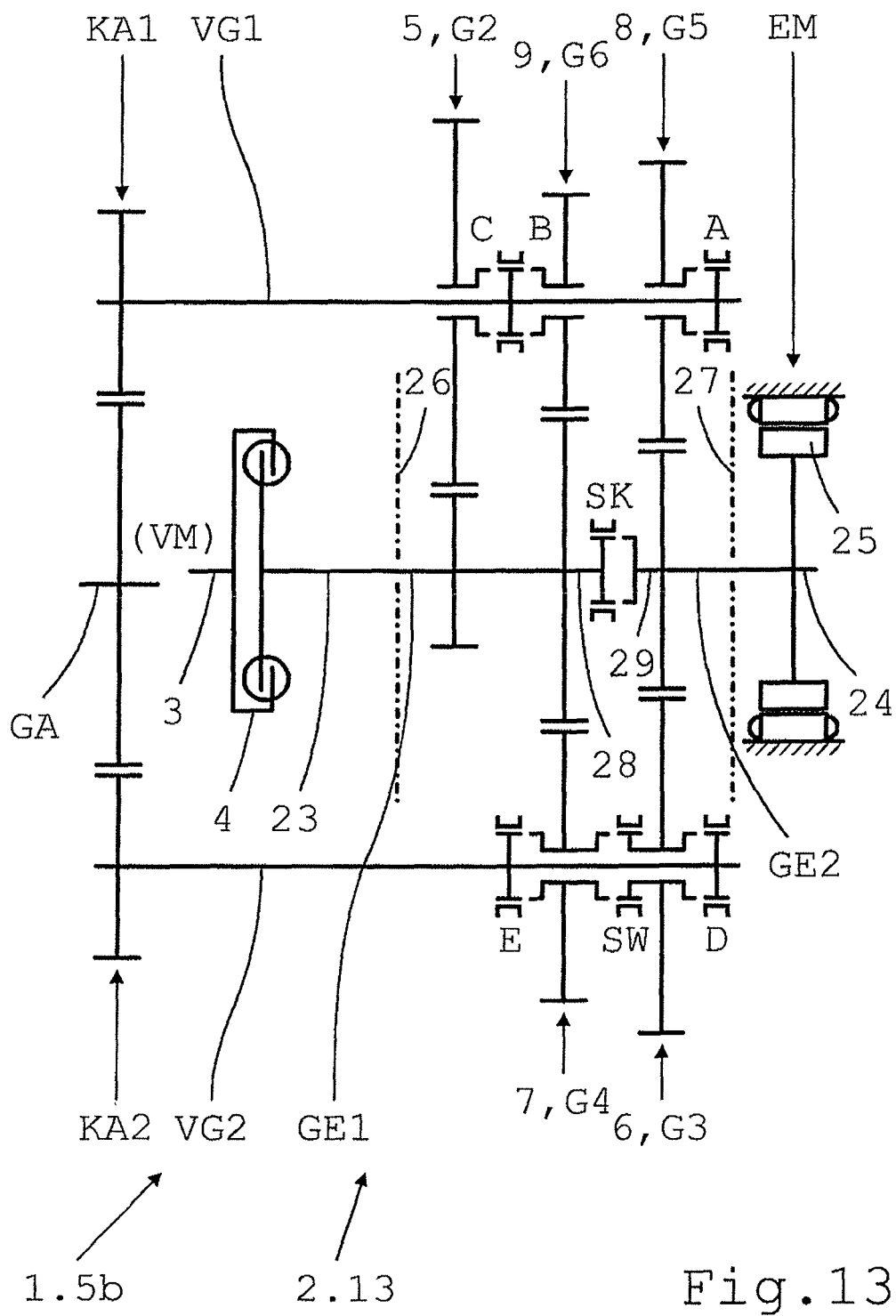

A hybrid drive train 1.5b, depicted in FIG. 13 that is a second modification of the fifth hybrid drive train 1.5 according to FIG. 11 and is functionally equivalent thereto, differs therefrom, in that the gear wheel sets 5 to 9 are disposed axially mirrored with respect to the arrangement in the manual transmission 2.11 from FIG. 11. The second input shaft GE2 is now disposed axially adjacent to the first input shaft GE1 and extends out radially opposite the respective end wall 27 of the housing of the manual transmission 2.13. Accordingly, the electric machine EM is now disposed on the side of the manual transmission 2.13 axially across from the internal combustion engine VM, and the second input shaft GE2 is connected at the end 24 thereof, outside of the transmission, directly to the rotor 25 of the electric machine EM.

Figure 14:
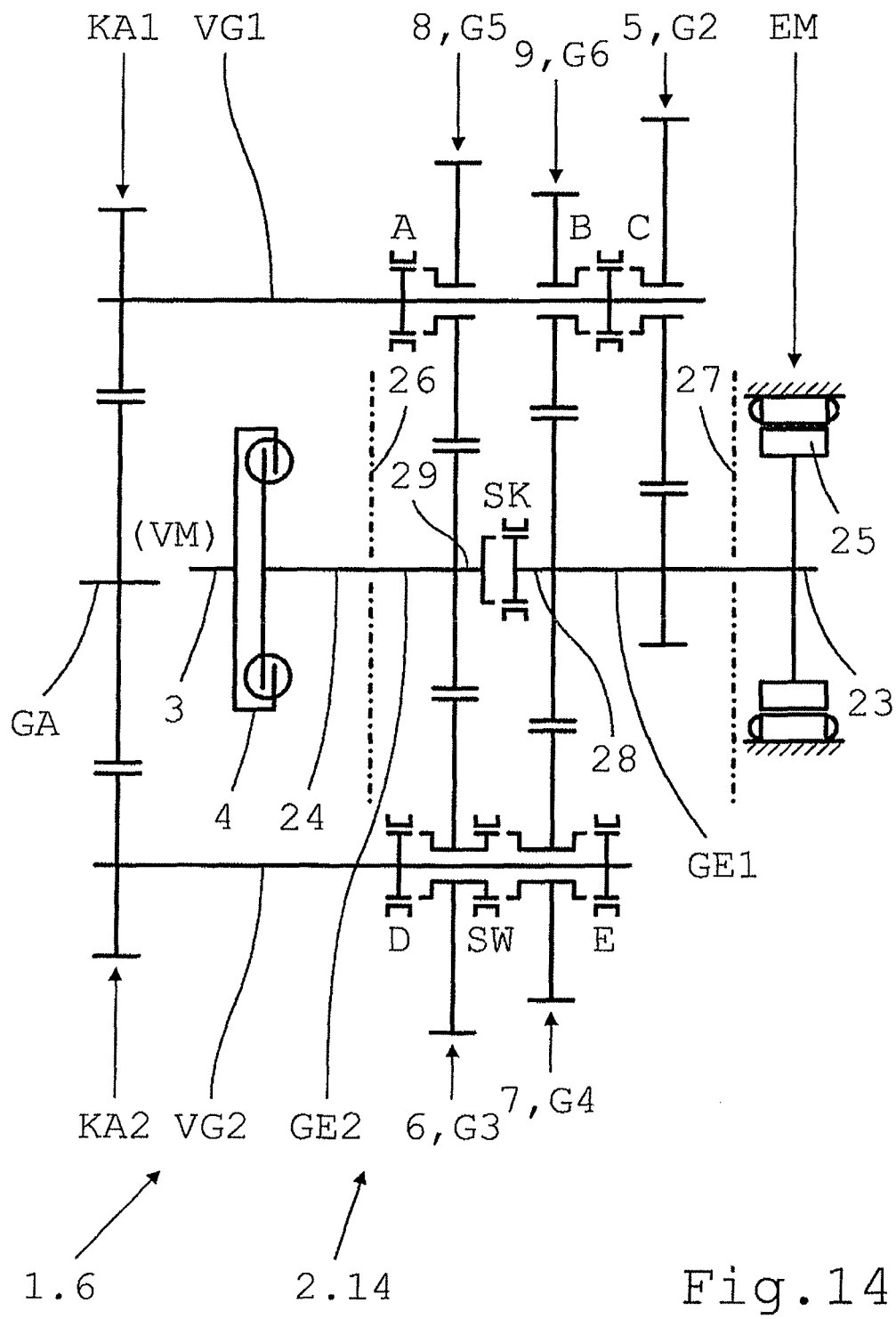

A sixth hybrid drive 1.6 according to the invention, according to FIG. 14, which comprises a manual transmission 2.14 derived from the double clutch transmission 2.0 according to FIG. 21, has largely the same design as that of the second hybrid drive 1.2 according to FIG. 4 and differs therefrom only in that a friction clutch K2 for attaching the internal combustion engine VM to the second input shaft GE2 is omitted. Thus, the second input shaft GE2 is connected in a rotationally fixed manner at the end 24 thereof, outside of the transmission, (via the torsional vibration damper 4) directly to the drive shaft 3 of the internal combustion engine VM. Accordingly, start-up can only occur using the electric motor. Because the direction of rotation of the electric machine EM can be reversed, a reverse gear wheel set can be omitted. Therefore, in the manual transmission 2.14 according to FIG. 14, in contrast to the manual transmission 2.4 according to FIG. 4, the idler gear 19 and the associated gear clutch F of the reverse gear R1 are omitted.

Figure 14A:
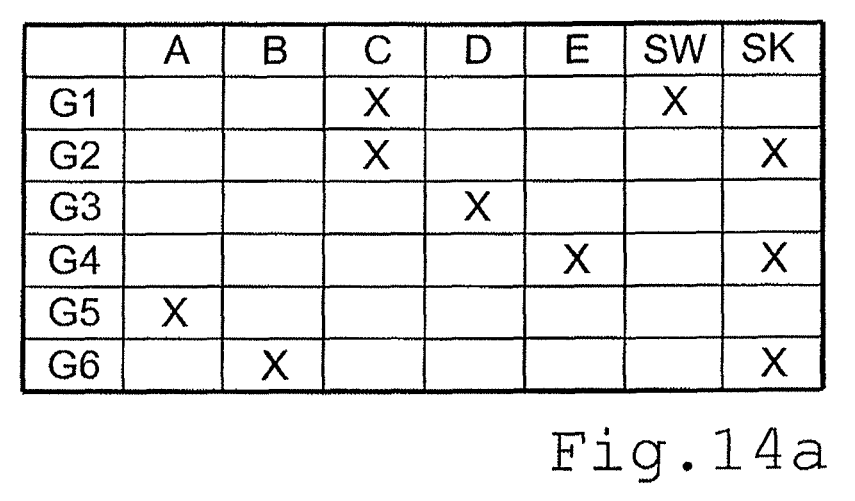

For an internal combustion engine driving operation, except for the seventh forward gear G7, all other forward gears G2 to G6 are available. The respective gears G1 to G6, are compiled in FIG. 14a in a tabular operating and shift pattern, in which the engaged, or closed state, of the gear clutches A to E, the winding-path shift element SW, and the coupling shift element SK for shifting the gears G1 to G6, are each marked with an X.

In electric driving operation of the hybrid drive 1.6 according to FIG. 14, only the gears G2, G4, G6 assigned to the first input shaft GE1, are available. In hybrid driving operation, the electric machine EM, selectively in one of the gears G2, G4, G6 or with the coupling shift element SK engaged, can be operated as a motor for supporting the internal combustion engine VM, or as a generator for charging an electric energy store. A further coupling of the two input shafts GE1, GE2 can additionally be produced by engaging the winding-path shift element SW (SK disengaged), which however, is disadvantageously connected with a lower rotational speed of the electric machine EM, compared to the internal combustion engine VM.

Figure 15:
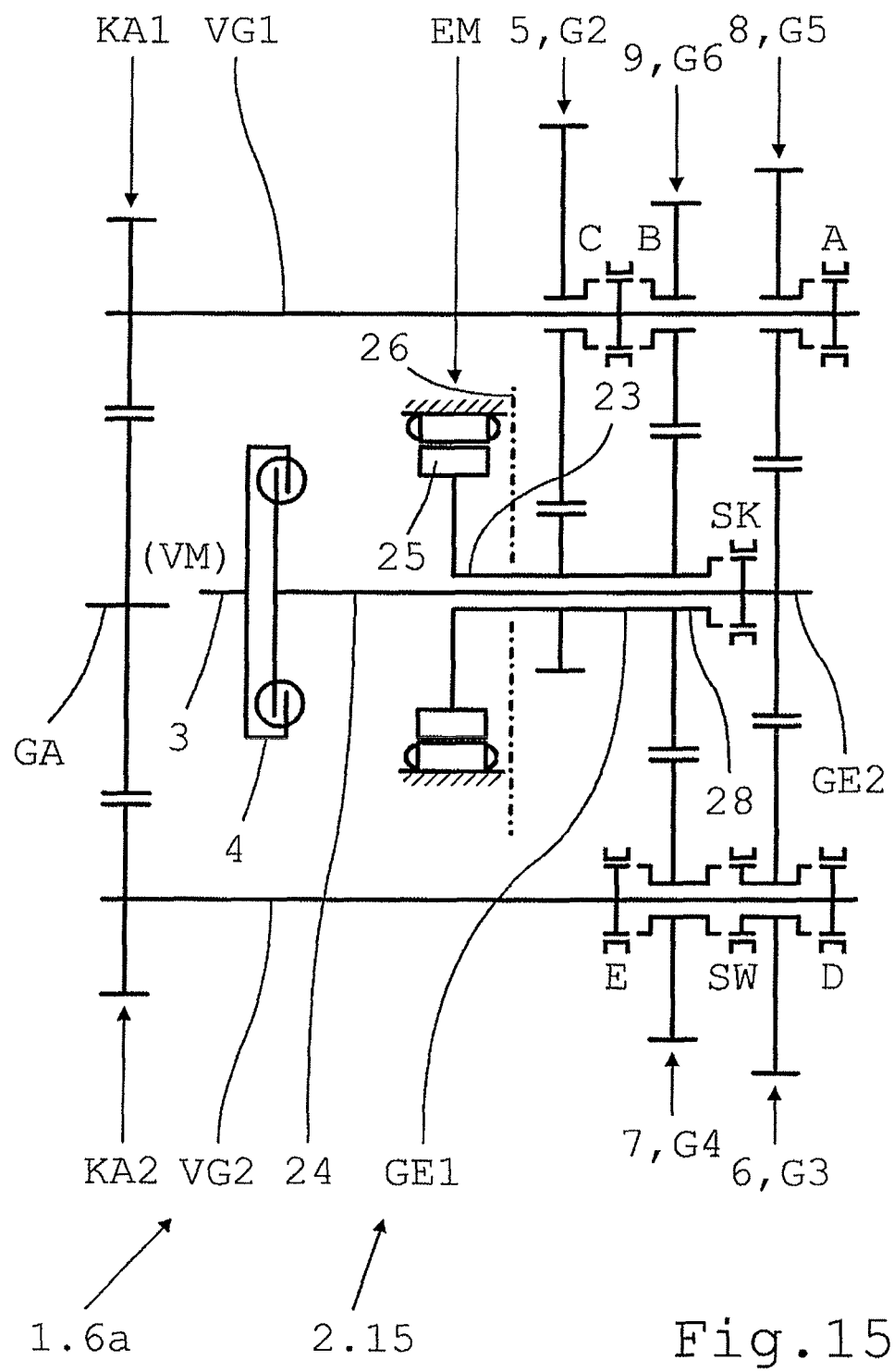

A hybrid drive train 1.6a, depicted in FIG. 15 that is a first modification of the sixth hybrid drive train 1.6 according to FIG. 14 and is functionally equivalent thereto, differs therefrom in that the gear wheel sets 5 to 9 are disposed axially mirrored with respect to the arrangement in the manual transmission 2.14 of FIG. 14. In FIG. 14, the first input shaft GE1 is disposed axially adjacent to the second input shaft GE2 and extends out radially opposite the respective end wall 27 of the housing of the manual transmission 2.14. Accordingly, the electric machine EM, in FIG. 14, is disposed on the side of the manual transmission 2.14 axially across from the internal combustion engine VM, and the first input shaft GE1 is directly connected at the end 23 thereof, outside of the transmission, to the rotor 25 of the electric machine EM.

Figure 16:
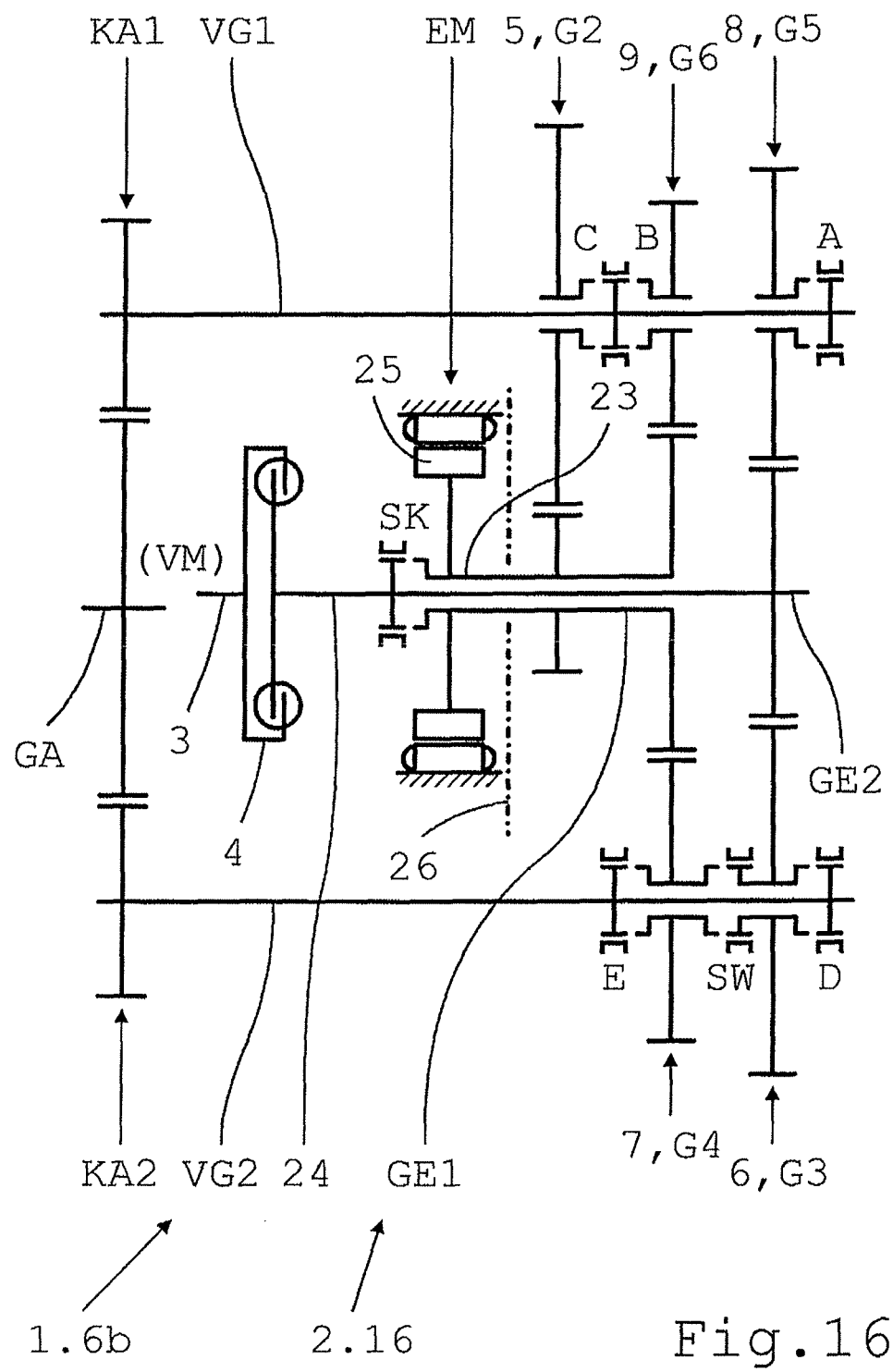

A hybrid drive train 1.6b, depicted in FIG. 16, which is a second modification of the sixth hybrid drive train 1.6 according to FIG. 14 and has the same function possibilities thereto, differs from the previously described hybrid drive train 1.5a according to FIG. 15 in that the coupling shift element SK is now disposed outside of the manual transmission 2.16 between the end 23 of the first input shaft GE1, outside of the transmission, implemented as a hollow shaft and the central second input shaft GE2.

Figure 17:
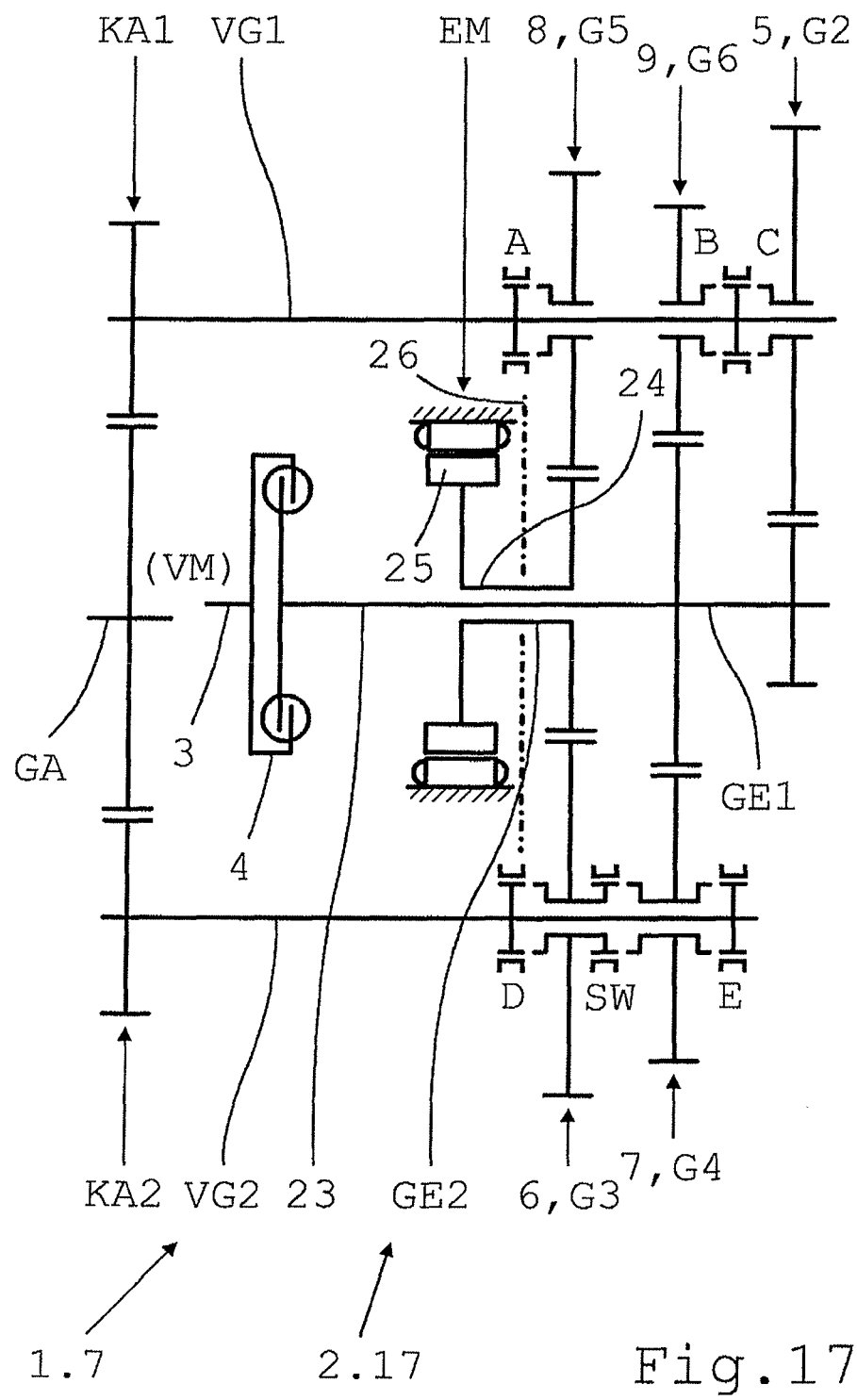

A seventh hybrid drive 1.7 according to the invention, according to FIG. 17 which comprises a manual transmission 2.17 derived from the double clutch transmission 2.0 according to FIG. 21, has largely the same design as that of the first hybrid drive 1.1 according to FIG. 1 and differs therefrom only in that a coupling shift element SK, for coupling the two input shafts GE1, GE2, and a friction clutch K1 for attaching the internal combustion engine VM to the first input shaft GE1, are omitted. Thus, the first input shaft GE1 is connected in a rotationally fixed manner at the end 23 thereof, outside of the transmission, (via the torsional vibration damper 4) directly to the drive shaft 3 of the internal combustion engine VM. Accordingly, start-up can only occur using the electric motor. Because the direction of rotation of the electric machine EM can be reversed, a reverse gear wheel set can be omitted. Therefore, in the manual transmission 2.17 according to FIG. 17, compared to the manual transmission 2.1 according to FIG. 1, the idler gear 19 and the associated gear clutch F of the reverse gear R1 are omitted.

Figure 17A:
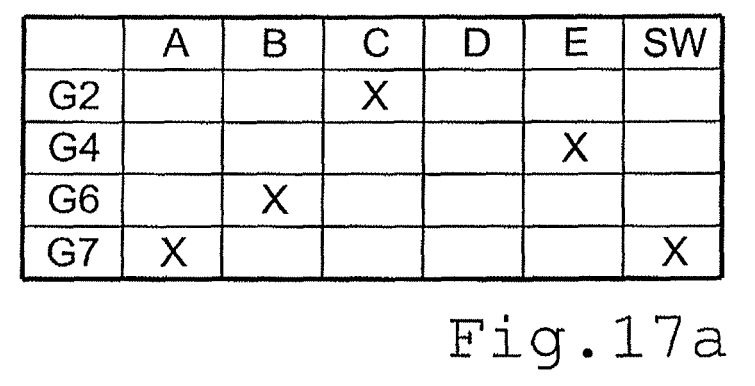

For an internal combustion engine driving operation, therefore only the gears G2, G4, G6 assigned to the first input shaft GE1, and the seventh forward gear G7, acting as a winding-path gear attached to the first input shaft GE1, are available. The corresponding gears G2, G4, G6, G7 are compiled in FIG. 17a in a tabular operating shift pattern, in which the engaged, or closed state, of the gear clutches A to E and the winding-path shift element SW for shifting the gears G2, G4, G6, G7 are each marked with an X.

In electric driving operation of the hybrid drive 1.7 only the gears G3, G5 assigned to the second input shaft GE2, are available. In hybrid driving operation, the electric machine EM with the engaged third or fifth forward gear G3, G5 can be operated as a motor for supporting the internal combustion engine VM, or as a generator for charging an electric energy store. A coupling of the two inputs shafts GE1, GE2 can be produced also by engaging the winding-path shift element SW, which advantageously leads to a higher rotational speed of the electric machine EM, compared to the internal combustion engine VM.

Figure 18:
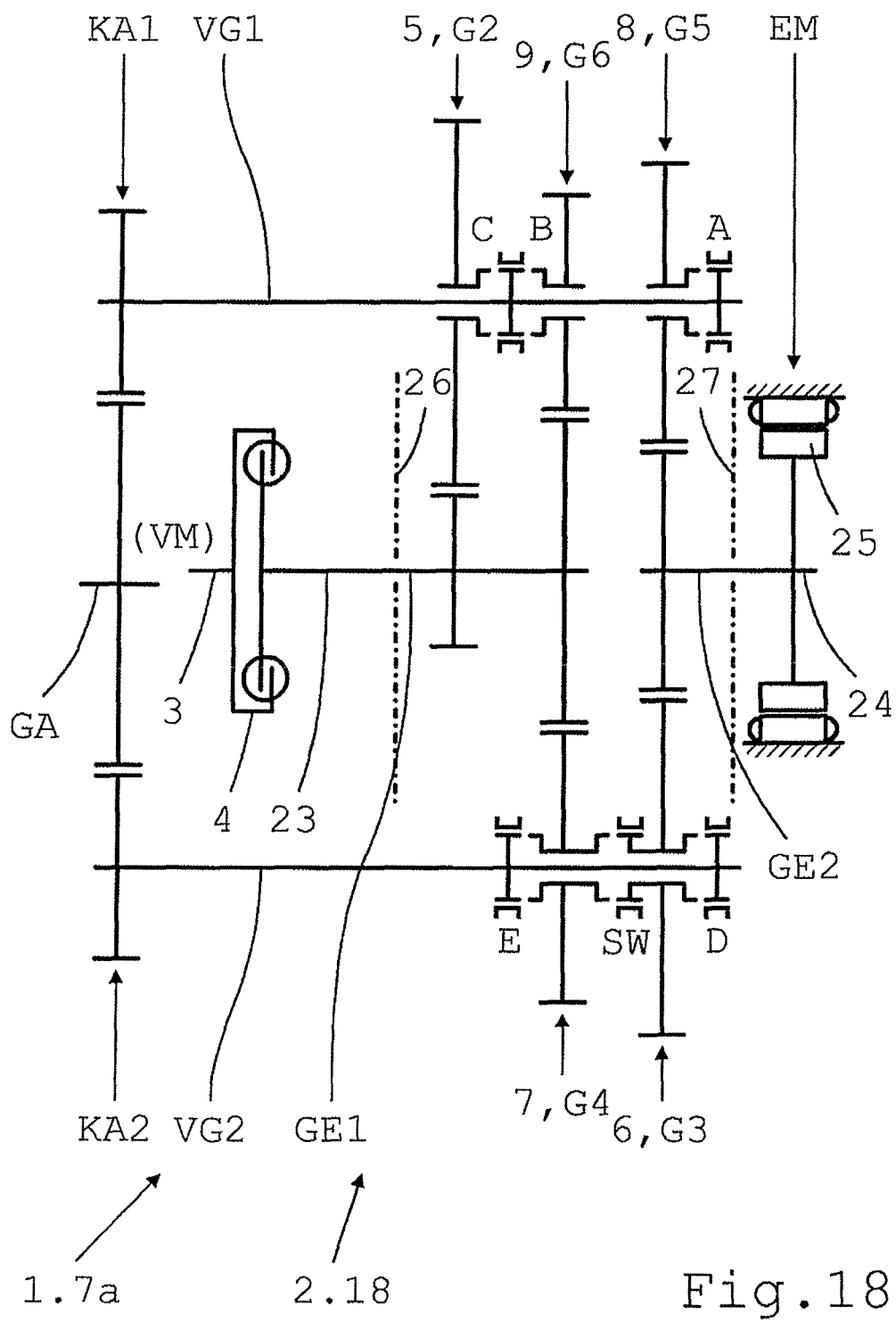

With the hybrid drive train 1.7a, depicted in FIG. 18, which represents a modification of the seventh hybrid drive train 1.7 according to FIG. 17 and is functionally equivalent thereto, the gear wheel sets 5 to 9 are disposed axially mirrored compared to the arrangement in the manual transmission 2.17 from FIG. 17, and the second input shaft GE2 is disposed axially adjacent to the first input shaft GE1 and extends radially out of the opposite respective end wall 27 of the housing of the manual transmission 2.17. Accordingly, the electric machine EM is now disposed on the side of the manual transmission 2.17, axially across from the internal combustion engine VM, and the second input shaft GE2 is connected at the end 24 thereof, outside of the transmission, directly to the rotor 25 of the electric machine EM.

Figure 19:
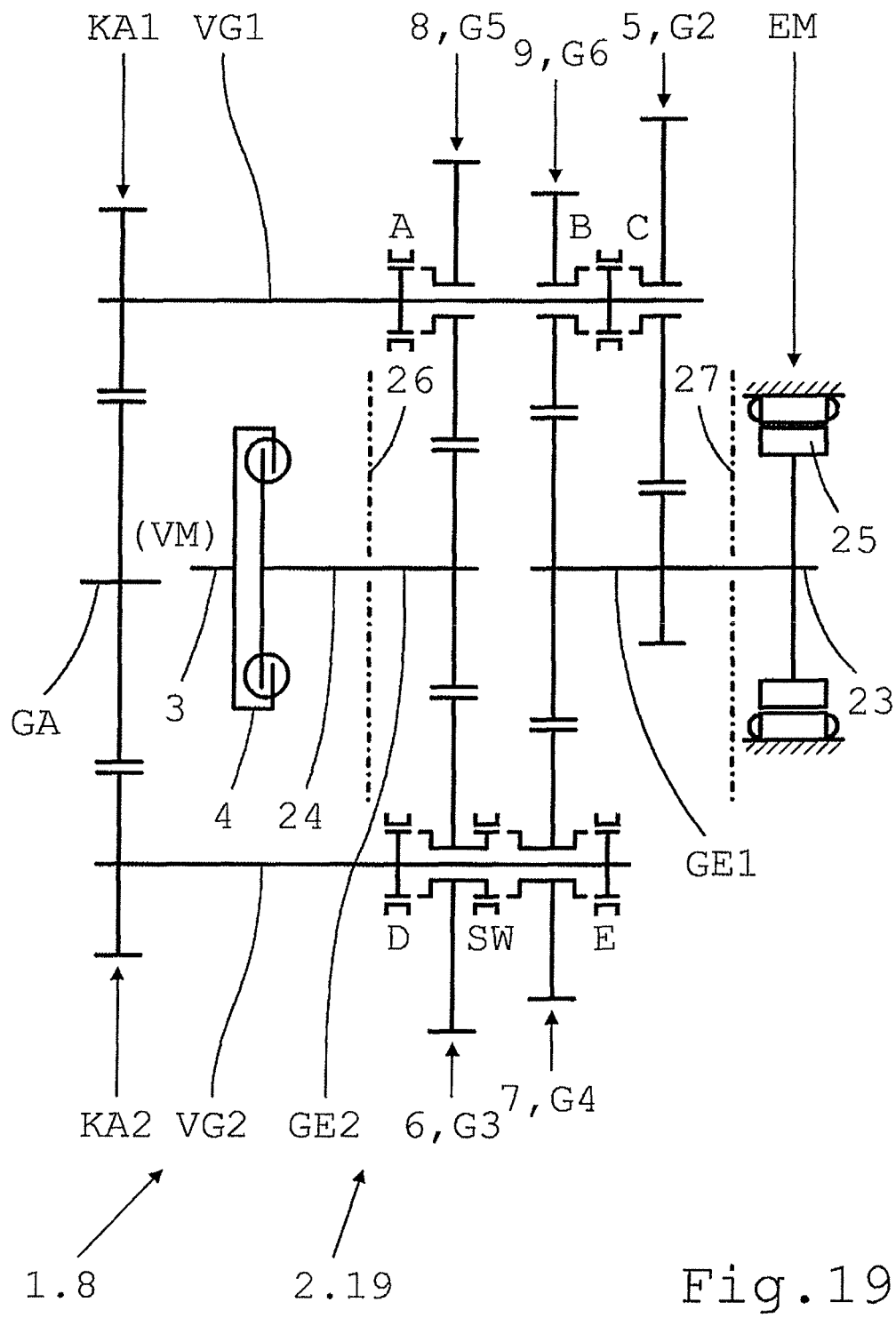

An eighth hybrid drive 1.8 according to the invention, according to FIG. 19, which comprises a manual transmission 2.19 derived from the double clutch transmission 2.0 according to FIG. 21, has largely the same design as that of the second hybrid drive 1.2 according to FIG. 4 and differs therefrom only in that a coupling shift element SK for coupling the two input shafts GE1, GE2 and a friction clutch K2 for attaching the internal combustion engine VM to the second input shaft GE2 are omitted. Thus, the second input shaft GE2 is connected in a rotationally fixed manner at the end 24 thereof, outside of the transmission, (via the torsional vibration damper 4) directly to the drive shaft 3 of the internal combustion engine VM. Accordingly, start-up can only occur using the electric motor. Because the direction of rotation of the electric machine EM can be reversed, a reverse gear wheel set can be omitted. Therefore, in the manual transmission 2.19 according to FIG. 19, compared to the manual transmission 2.4 according to FIG. 4, the idler gear 19 and the associated gear clutch F of the reverse gear R1 are omitted.

Figure 19A:
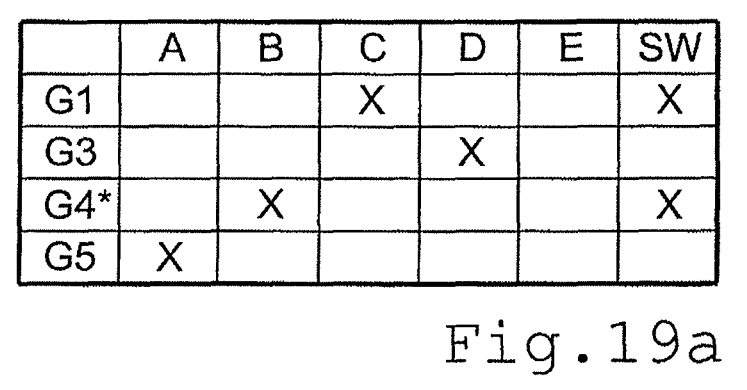

For an internal combustion engine driving operation, only the gears G3 and G5 assigned to the second input shaft GE2, and the first forward gear G1, acting as a winding-path gear attached to the second input shaft GE2, are available. However, by simultaneously engaging the gear clutch B and the winding-path shift element SW, a further forward gear G4\* can be shifted as a winding-path gear, which was not used up until now, and whose transmission ratio corresponds approximately to that of the fourth gear G4. The respective gears G1, G3, G4\*, G5 are combined in FIG. 19a in a tabular operating and shift pattern, in which the engaged, or closed state, of the gear clutches A to E and the winding-path shift element SW for shifting the gears G1, G3, G4\*, G5 are each marked with an X.

In electric driving operation of the hybrid drive 1.8 only the gears G2, G4, G6 assigned to the first input shaft GE1, are available. In hybrid driving operation, the electric machine EM with the engaged gear G2, G4, G6, can be operated as a motor for supporting the internal combustion engine VM, or as a generator for charging an electric energy store. A coupling of the two input shafts GE1, GE2 can additionally be produced by engaging the winding-path shift element SW, which disadvantageously is connected with a lower rotational speed of the electric machine EM, compared to the internal combustion engine VM.

Figure 20:
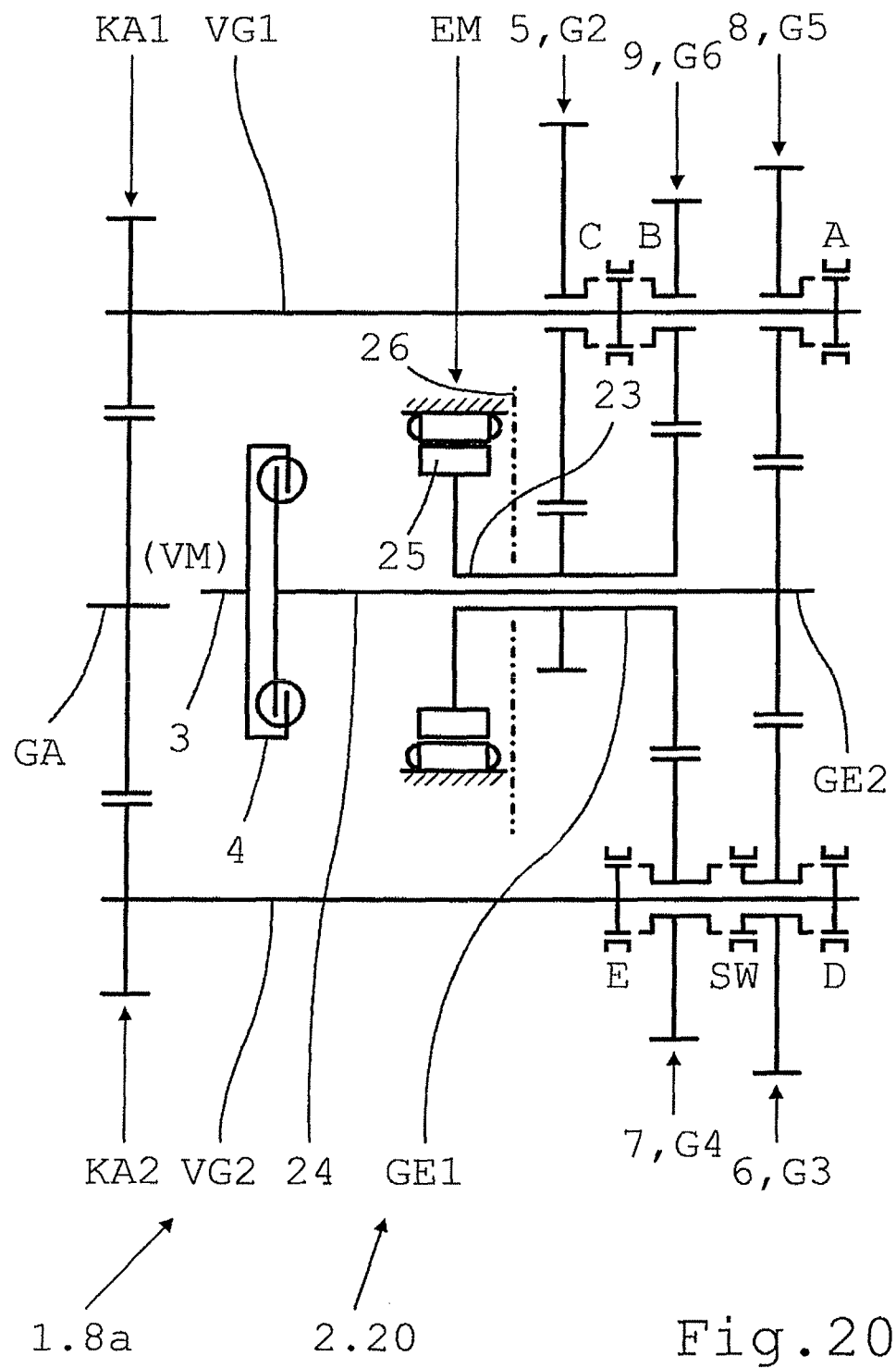

With the hybrid drive train 1.8a, depicted in FIG. 20, which represents a modification of the eighth hybrid drive train 1.8 according to FIG. 19 and is functionally equivalent thereto, the gear wheel sets 5 to 9 are disposed axially mirrored with respect to the arrangement in the manual transmission 2.19 from FIG. 19, and the first input shaft GE1 is implemented as a hollow shaft and disposed coaxially over the second input shaft GE2, and extends axially out of the same end wall 26 of the housing of the manual transmission 2.20 as the second input shaft GE2. Accordingly, the electric machine EM is now disposed axially on the same side of the manual transmission 2.20 as the internal combustion engine VM, and the first input shaft GE1 is connected at the end 23 thereof, outside of the transmission, directly to the rotor 25 of the electric machine EM.

REFERENCE CHARACTERS 1.1 first hybrid drive
1.1a hybrid drive, first modification of 1.1
1.1b hybrid drive, second modification of 1.1
1.2 second hybrid drive
1.2a hybrid drive, first modification of 1.2
1.2b hybrid drive, second modification of 1.2
1.3 third hybrid drive
1.3a hybrid drive, modification of 1.3
1.4 fourth hybrid drive
1.4a hybrid drive, modification of 1.4
1.5 fifth hybrid drive
1.5a hybrid drive, first modification of 1.5
1.5b hybrid drive, second modification of 1.5
1.6 sixth hybrid drive
1.6a hybrid drive, first modification of 1.6
1.6b hybrid drive, second modification of 1.6
1.7 seventh hybrid drive
1.7a hybrid drive, modification of 1.7
1.8 eighth hybrid drive
1.8a hybrid drive, modification of 1.8
2.0 double clutch transmission
2.1 first manual transmission
2.2 second manual transmission
2.3 third manual transmission
2.4 fourth manual transmission
2.5 fifth manual transmission
2.6 sixth manual transmission
2.7 seventh manual transmission
2.8 eighth manual transmission
2.9 ninth manual transmission
2.10 tenth manual transmission
2.11 eleventh manual transmission
2.12 twelfth manual transmission
2.13 thirteenth manual transmission
2.14 fourteenth manual transmission
2.15 fifteenth manual transmission
2.16 sixteenth manual transmission
2.17 seventeenth manual transmission
2.18 eighteenth manual transmission
2.19 nineteenth manual transmission
2.20 twentieth manual transmission
3 drive shaft
4 torsional vibration damper
5 gear wheel set of G2
6 gear wheel set of G3
7 gear wheel set of G4
8 gear wheel set of G5
9 gear wheel set of G6
10 gear wheel set of R1
11 fixed gear of G2, R1
12 fixed gear of G3, G5
13 fixed gear of G4, G6
14 idler gear of G2
15 idler gear of G3
16 idler gear of G4
17 idler gear of G5
18 idler gear of G6
19 idler gear of R1
20 fixed gear of KA1
21 fixed gear of KA2
22 output gear of KA1, KA2
23 transmission outer end of GE1
24 transmission outer end of GE2
25 rotor of EM
26 end wall of housing
27 end wall of housing
28 transmission inner end of GE1
29 transmission inner end of GE2
A gear clutch of G5
B gear clutch of G6
C gear clutch of G2
D gear clutch of G3
E gear clutch of G4
EK transmission step
EM first electric machine
EM2 second electric machine
F gear clutch of R1
G1-G7 forward gears
GA output shaft
GE1 first input shaft
GE2 second input shaft
$i_{EK}$ transmission ratio of EK
KA1 first output constant
KA2 second output constant
K1 first friction clutch
K2 second friction clutch
R1 first reverse gear
R2 second reverse gear
SK coupling shift element
SW winding-path shift element
VM internal combustion engine

The invention claimed is:

1. A hybrid drive of a motor vehicle, which has an automated manual transmission (2.1-2.20) derived from a double clutch transmission (2.0) having two coaxially disposed input shafts (GE1, GE2) and a common output shaft (GA), in which one of the two input shafts (GE1; GE2) of the hybrid drive is connectable to a drive shaft (3) of an internal combustion engine (VM) and is drivingly connectable with the output shaft (GA) via an associated first group of selectively shiftable gear wheel sets (5, 7, 9, 10; 6, 8), and the other input shaft (GE2; GE1) of the hybrid drive is in drive connection with a rotor (25) of an electric machine (EM) that is operable as a motor and as a generator, and is drivingly connectable with the output shaft (GA) via an assigned second group of selectively shiftable gear wheel sets (6, 8; 5, 7, 9, 10), the gear wheel sets (5-10) are disposed, in each case, between one of the two input shafts (GE1, GE2) and one of two countershafts (VG1, VG2) that are each in drive connection with the output shaft (GA) via an output constant (KA1, KA2), each gear wheel set (5-10) comprises a fixed gear (11-13) that is disposed on the associated input shaft (GE1, GE2) in a rotationally fixed manner and an idler gear (14-19) that is disposed on the respective countershaft (VG1, VG2), per input shaft (GE1, GE2) at least the two gear wheel sets (7, 9; 6, 8), internal to the transmission, with idler gears (16, 18; 15, 17) disposed on different countershafts (VG1, VG2), are disposed in a common radial plane with use of a common fixed gear (12, 13), at least two idler gears (15, 16), disposed on one of the two countershafts (VG1, VG2) of two gear wheel sets (6, 7), internal to the transmission, assigned to the two different input shafts (GE1, GE2), is couplable together via a winding-path shift element (SW), and the two output constants (KA1, KA2) are disposed in a common radial plane and mesh with a common output gear (22) disposed on the output shaft (GA).

2. The hybrid drive according to claim 1, wherein a coupling shift element (SK) couples the two input shafts (GE1, GE2) with one another.

3. The hybrid drive according to claim 1, wherein the one input shaft (GE1; GE2) is centrally disposed and extends axially out of one side of an end wall of a housing (26) of the manual transmission (2.1, 2.2, 2.5, 2.6, 2.7, 2.10, 2.11, 2.12, 2.15, 2.16, 2.17, 2.20), and the other input shaft (GE2; GE1) is implemented as a hollow shaft and is disposed coaxially surrounding the one input shaft (GE1 or GE2) and extends axially out of the same end wall of the housing (26), and the internal combustion engine (VM) is disposed at an end (23, 24) of the central input shaft (GE1 or GE2), outside of the transmission, and the electric machine (EM) is disposed axially on a same side at the end (24, 23) as the input shaft (GE2 or GE1), outside of the transmission, implemented as a hollow shaft.

4. The hybrid drive according to claim 2, wherein the coupling shift element (SK) is disposed within the manual transmission (2.1, 2.5, 2.11, 2.15) between an end (28, 29) of the input shaft (GE2 or GE1), inside of the transmission, implemented as a hollow shaft and the central input shaft (GE1 or GE2).

5. The hybrid drive according to claim 2, wherein the coupling shift element (SK) is disposed outside the manual transmission (2.2, 2.6, 2.12, 2.16) between an end (23, 24) of the input shaft (GE2; GE1), outside of the transmission, implemented as a hollow shaft and the central input shaft (GE1; GE2).

6. The hybrid drive according to claim 1, wherein the two input shafts (GE1, GE2) are disposed axially adjacent one another and extend respectively axially opposite out of end walls of a housing (26, 27) of the manual transmission (2.3, 2.4, 2.8, 2.9, 2.13, 2.14, 2.18, 2.19), and the internal combustion engine (VM) is disposed at an end (23, 24) of the one input shaft (GE1; GE2), outside of the transmission, and the electric machine (EM) is disposed axially opposite at an end (24, 23) of the other input shaft (GE2; GE1), outside of the transmission.

7. The hybrid drive according to claim 2, wherein the coupling shift element (SK) is disposed within the manual transmission (2.3, 2.4, 2.13, 2.14) between ends (28, 29) of the two input shafts (GE1, GE2), inside of the transmission.

8. The hybrid drive according to claim 1, wherein the one input shaft (GE1; GE2) is connectable, via a friction clutch (K1 or K2) that is engagable or disengagable, to the drive shaft (3) of the internal combustion engine (VM).

9. The hybrid drive according to claim 1, wherein the one input shaft (GE1; GE2) is connected in a rotationally fixed manner, either directly or via a torsional vibration damper (4), to the drive shaft (3) of the internal combustion engine (VM).

10. The hybrid drive according to claim 1, wherein the other input shaft (GE2; GE1) is connected in a rotationally fixed manner directly to the rotor (25) of the electric machine (EM).

11. The hybrid drive according to claim 1, wherein the other input shaft (GE2; GE1) is drivingly connected with the rotor (25) of the electric machine (EM) via a transmission step (EK), which has an underdrive transmission ratio ($i_{EK}>1$).

12. The hybrid drive according to claim 1, wherein at least one common fixed gear (11, 12, 13), of two gearwheel sets (5, 6, 7, 8, 9, 10) disposed in a common gear plane, is formed as a stepped gear.

13. The hybrid drive according to claim 1, wherein the one input shaft (GE1, GE2) is additionally in drive connection with a rotor of a second electric machine (EM2), which is disposed at an end (23, 24) of the one input shaft (GE1 or GE2), outside of the transmission.

14. The hybrid drive according to claim 13, wherein the second electric machine (EM2) is a starter generator.

15. A hybrid drive of a motor vehicle comprising:
an automated manual transmission having first and second input shafts, first and second countershafts and a common output shaft, the second input shaft is hollow and is connected to a rotor of an electric machine that is operable as a motor and a generator, and the second input shaft has a fixed gear that is continuously connected thereto, the first input shaft is coaxial with and extends through the second input shaft, the first input shaft is connectable to a combustion engine drive shaft and has a fixed gear that is continuously connected thereto, and each of the first and the second input shafts is drivingly connectable with the common output shaft via a respective gearwheel set;
a first of the gearwheel sets comprises the fixed gear of the first input shaft, an idler gear supported by the first countershaft and an idler gear supported by the second countershaft and the first gearwheel set is aligned in one radial plane and a second of the gearwheel sets comprises the fixed gear of the second input shaft, another idler gear supported by the first countershaft and another idler gear supported by the second countershaft and the second gearwheel set is aligned in another radial plane;
the idler gears of the first and the second gearwheel sets that are supported by the first countershaft are connectable via a winding-path shift element; and
each of the first and the second countershafts comprises an output constant that is aligned and meshes with a common output gear in a further radial plane, the common output gear is continuously connected to the common output shaft.

16. The hybrid drive according to claim 15, wherein a coupling shift element couples the first and the second input shafts.

* * * * *